(12) United States Patent
Kitaoka

(10) Patent No.: US 7,256,590 B2
(45) Date of Patent: Aug. 14, 2007

(54) CAPACITANCE SENSOR TYPE MEASURING APPARATUS

(75) Inventor: Atsushi Kitaoka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/565,724

(22) Filed: Dec. 1, 2006

(65) Prior Publication Data

US 2007/0103171 A1    May 10, 2007

Related U.S. Application Data

(63) Continuation of application No. 10/795,257, filed on Mar. 9, 2004, now Pat. No. 7,212,015.

(30) Foreign Application Priority Data

Mar. 13, 2003 (JP) .............................. 2003-067779
Jun. 19, 2003 (JP) .............................. 2003-175236
Dec. 9, 2003 (JP) .............................. 2003-410335

(51) Int. Cl.
*G01R 27/26* (2006.01)
*G01R 31/08* (2006.01)
(52) U.S. Cl. ..................... 324/688; 324/662; 324/519
(58) Field of Classification Search ................ 324/688, 324/662, 519
See application file for complete search history.

(56) References Cited

U.S. PATENT DOCUMENTS

| | | | |
|---|---|---|---|
| 4,183,060 A * | 1/1980 | Barnette et al. ............ 369/106 |
| 6,310,482 B1 | 10/2001 | Hong ......................... 324/681 |
| 6,315,574 B1 | 11/2001 | Kamieniecki et al. ........ 439/16 |
| 6,388,436 B1 | 5/2002 | Nodot et al. ............. 324/158.1 |
| 6,529,263 B2 | 3/2003 | Oguri et al. .................. 355/53 |
| 2003/0020891 A1 | 1/2003 | Tokita ......................... 355/53 |

* cited by examiner

*Primary Examiner*—Anjan Deb
*Assistant Examiner*—Amy He
(74) *Attorney, Agent, or Firm*—Fitzpatrick, Cella, Harper & Scinto

(57) ABSTRACT

A measuring apparatus having a probe that faces a surface of a target and is configured to supply AC current to the surface, measuring a voltage drop through a space between the probe and the surface, and obtaining a distance between the probe and the surface in accordance with the measured voltage drop. The apparatus includes a ground member facing, and apart from, the surface and configured to ground the surface by capacitive coupling, and a stage configured to hold either of the target and the probe and to move to define a measurement area on the surface. The ground member is configured so that the ground member faces all areas of the surface with respect to each of a plurality of measurement areas on the surface defined by a position of the stage.

4 Claims, 31 Drawing Sheets

FIG. 7
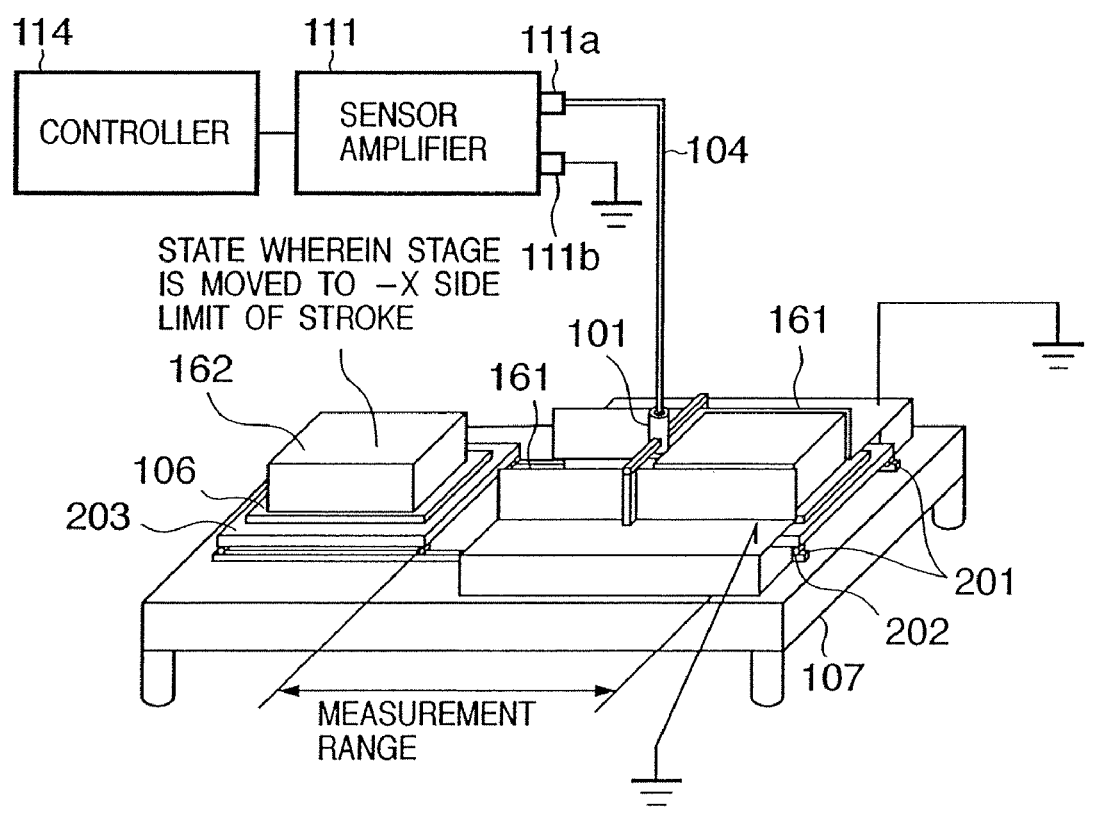
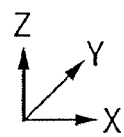

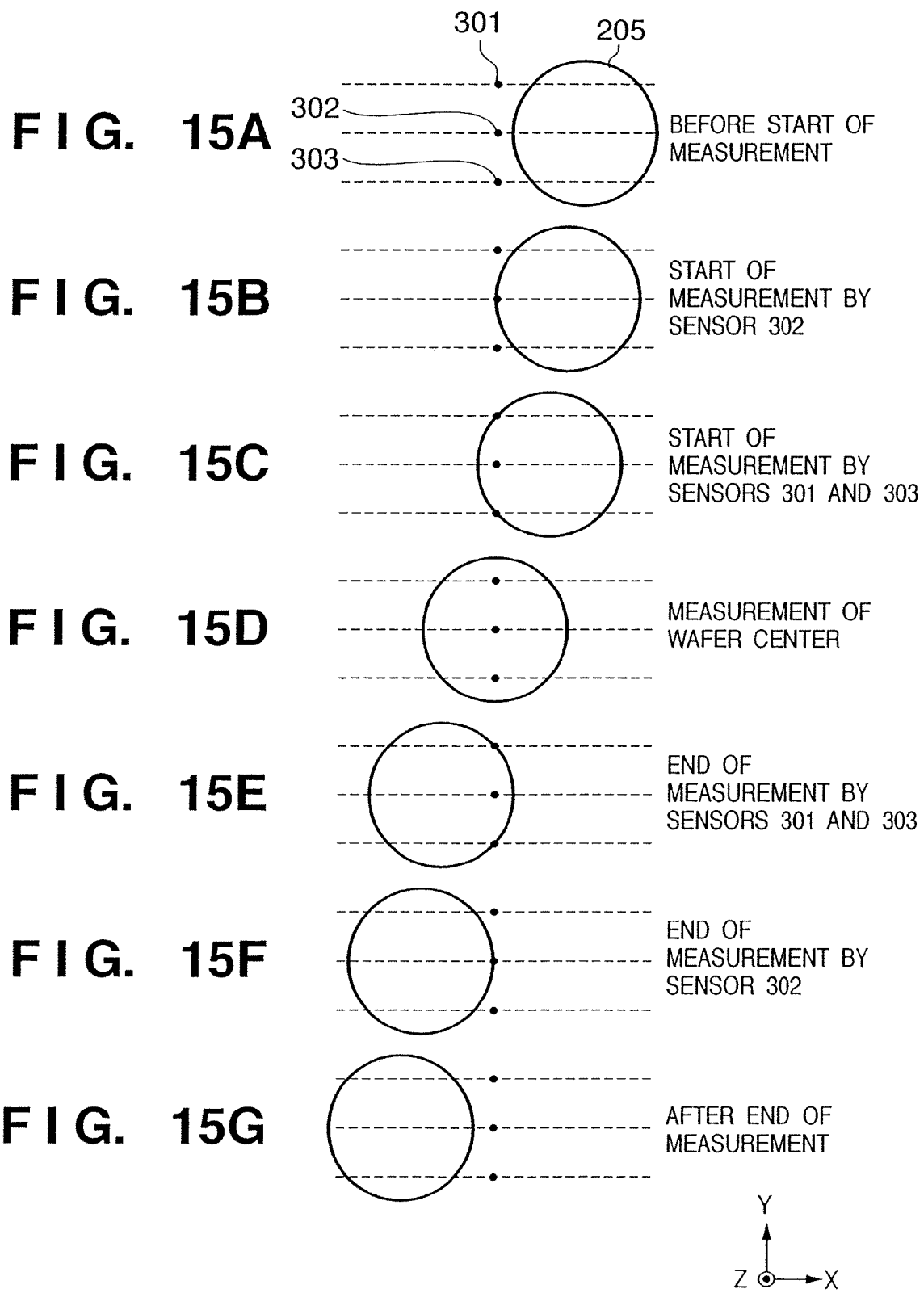

WAFER MEASUREMENT
(AT +X SIDE MEASUREMENT LIMIT)

WAFER MEASUREMENT
(AT -X SIDE MEASUREMENT LIMIT)

MASK MEASUREMENT
(AT +X LIMIT OF EXPOSURE AREA, CENTER OF Y)

MASK MEASUREMENT
(AT +X LIMIT OF EXPOSURE AREA, CENTER OF Y)

EXPOSURE
(IN EXPOSURE OF SHOT AT CENTER OF WAFER)

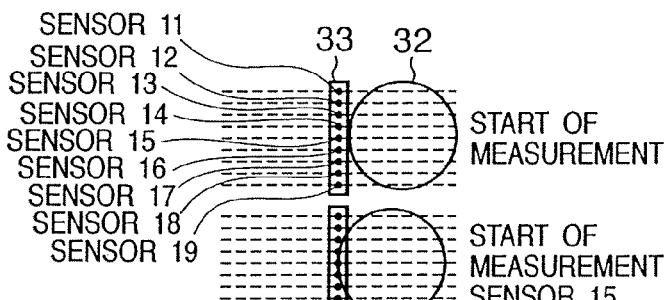
FIG. 24A  START OF MEASUREMENT

FIG. 24B  START OF MEASUREMENT BY SENSOR 15

FIG. 24C  START OF MEASUREMENT BY SENSORS 14 AND 16

FIG. 24D  START OF MEASUREMENT BY SENSORS 13 AND 17

FIG. 24E  START OF MEASUREMENT BY SENSORS 12 AND 18

FIG. 24F  START OF MEASUREMENT BY SENSORS 11 AND 19

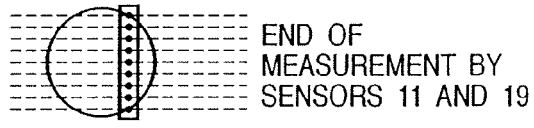
FIG. 24G  MEASUREMENT OF WAFER CENTER

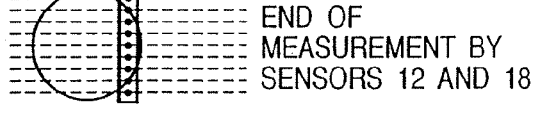
FIG. 24H  END OF MEASUREMENT BY SENSORS 11 AND 19

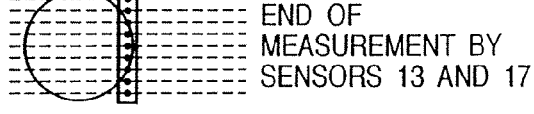
FIG. 24I  END OF MEASUREMENT BY SENSORS 12 AND 18

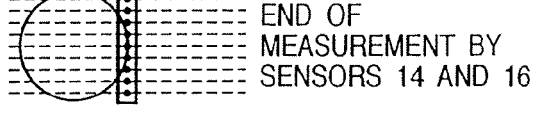
FIG. 24J  END OF MEASUREMENT BY SENSORS 13 AND 17

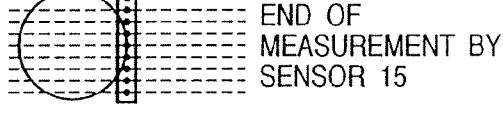
FIG. 24K  END OF MEASUREMENT BY SENSORS 14 AND 16

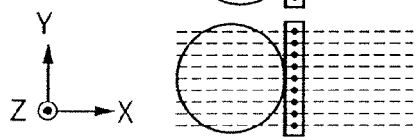
FIG. 24L  END OF MEASUREMENT BY SENSOR 15

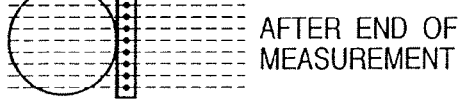
FIG. 24M  AFTER END OF MEASUREMENT

FIG. 25A
GROUND CURRENT AMPLITUDE VALUE
(RELATIVE VALUE)
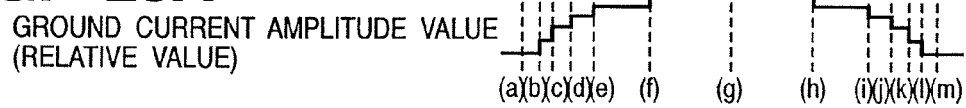

FIG. 25B
MEASUREMENT VALUE OF SENSOR AMPLIFIER 41
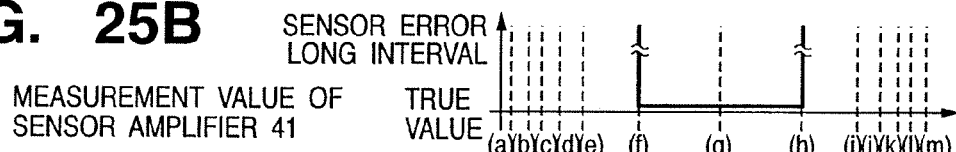

FIG. 25C
MEASUREMENT VALUE OF SENSOR AMPLIFIER 42
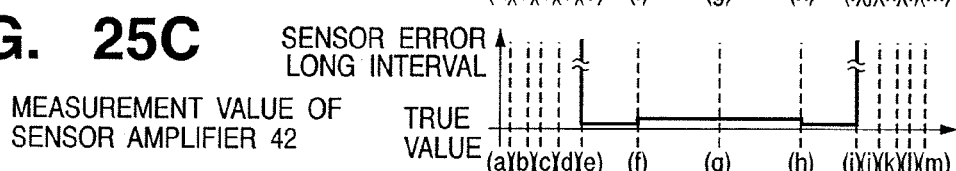

FIG. 25D
MEASUREMENT VALUE OF SENSOR AMPLIFIER 43
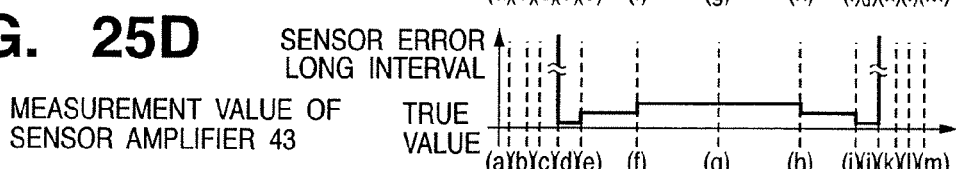

FIG. 25E
MEASUREMENT VALUE OF SENSOR AMPLIFIER 44
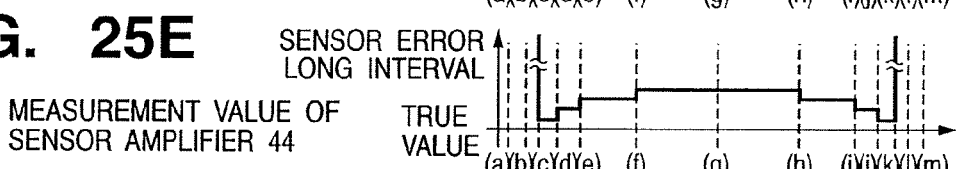

FIG. 25F
MEASUREMENT VALUE OF SENSOR AMPLIFIER 45
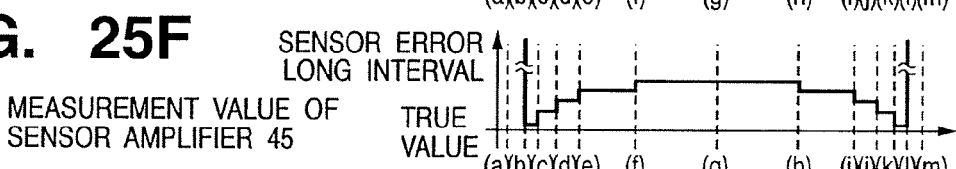

FIG. 25G
MEASUREMENT VALUE OF SENSOR AMPLIFIER 46
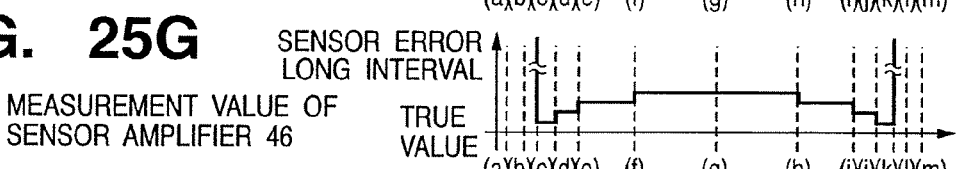

FIG. 25H
MEASUREMENT VALUE OF SENSOR AMPLIFIER 47
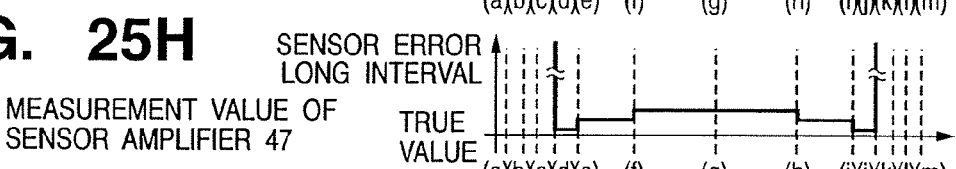

FIG. 25I
MEASUREMENT VALUE OF SENSOR AMPLIFIER 48
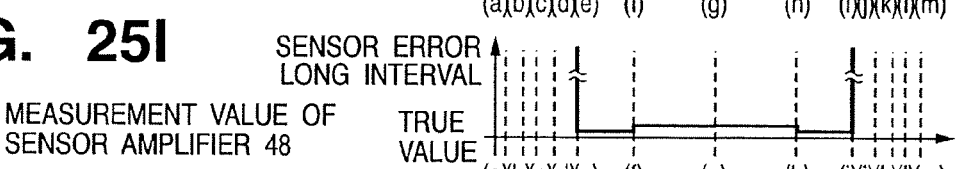

FIG. 25J
MEASUREMENT VALUE OF SENSOR AMPLIFIER 49
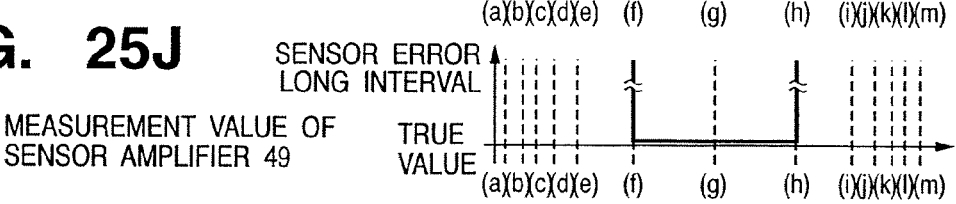

CAPACITANCE SENSOR TYPE MEASURING APPARATUS

This application is a continuation of U.S. patent application Ser. No. 10/795,257, filed Mar. 9, 2004, now U.S. Pat. No. 7,212,015.

FIELD OF THE INVENTION

The present invention relates to a measuring apparatus which measures the distance between a probe and a target. This measuring apparatus is suitably applied to, for example, an exposure system, which transfers a pattern onto a substrate, or the like, a machining system, which machines a substrate, or the like, and a semiconductor process system, or the like.

BACKGROUND OF THE INVENTION

One of the methods of precisely measuring the position or shape of a sample (target) uses an electrostatic capacitance sensor. In this method, the magnitude of an electrostatic capacitance generated between a sensor probe and a target is detected to measure the distance between the sensor probe and the target. The electrostatic capacitance is detected as an AC impedance.

More specifically, in many cases, weak AC currents from a sensor amplifier are supplied from a sensor probe to a target, and a voltage drop by the impedance is measured. Currents flowing from the sensor probe to the target generally flow back to the other terminal of the sensor amplifier via a conductor, which is set to be almost the same potential as that of the housing ground of the system. In general, an electrostatic capacitance to be measured is a small value, on the pF order, and is readily influenced by the stray capacitance. The potential is usually set so as to reduce the influence of the stray capacitance on mounting from a sensor amplifier to a sensor probe and mounting from a target to a ground line.

The electrostatic capacitance sensor is ideally used by coupling a target sufficiently low in impedance to ground at a low impedance. For this reason, it often uses an arrangement in which a table to mount the target is made of a conductor and is connected to ground.

FIG. 27 is a view of the arrangement of a conventional measuring apparatus using an electrostatic sensor. A chuck 106 of a target 105 is made of a metal to reduce the impedance between the target and ground. In FIG. 27, reference numeral 101 denotes a sensor probe; 111, a sensor amplifier; 104, a sensor cable; 107, an insulating surface plate; and 114, a controller. The surface plate 107 and chuck 106 constitute a table.

In some tables, however, there may be cases wherein it is difficult to join a target to ground at low impedance. These cases include, for example, a case wherein the shape of the target, the shape of the table, or the material for the table, is limited. In this case, conventional methods cannot couple the target to ground at a low impedance. As a result, the stability or precision of measurement may degrade or decrease, or the target may cause an offset.

A further problem occurs in measuring the surface position of the target. To measure the surface position of the target while the table is connected to ground, the internal impedance of the target needs to be sufficiently low or the individual difference needs to be small. This is because high internal impedance or a large individual difference causes a voltage drop inside the target, producing an error in a measurement value.

SUMMARY OF THE INVENTION

The present invention has as its object to provide a technique for solving the above-mentioned problems.

To solve the above-mentioned problems and to attain the object of the present invention, a measuring apparatus, which measures a distance between a probe and a target, comprises a ground member which opposes the target in a non-contact manner and substantially grounds the target and an output unit, which is connected to the probe and the ground member and outputs a signal based on an AC current corresponding to a capacitance between the probe and the target.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1A and 1B show the arrangement of a measuring apparatus according to the first embodiment, in which FIG. 1A is a perspective view, and FIG. 1B is a side view;

FIGS. 3A and 3B show the arrangement of a measuring apparatus according to the second embodiment, in which FIG. 3A is a perspective view, and FIG. 3B is a side view;

FIGS. 5A and 5B show the arrangement of a measuring apparatus according to Comparative Example 1 of the second embodiment, in which FIG. 5A is a perspective view, and FIG. 5B is a side view;

FIG. 7 is a perspective view showing the arrangement of a measuring apparatus according to a modification of the second embodiment;

FIGS. 9A and 9B show the arrangement of an X-ray exposure mask according to the third embodiment, in which FIG. 9A is a perspective view, and FIG. 9B is a sectional view taken along the line I-I;

FIGS. 10A and 10B show the arrangement of a measuring apparatus according to the fourth embodiment, in which FIG. 10A is a perspective view, and FIG. 10B is a side view;

FIGS. 12A and 12B show the arrangement of a measuring apparatus according to the fifth embodiment, in which FIG. 12A is a perspective view, and FIG. 12B is a side view;

FIGS. 15A to 15G are charts for explaining the relationship between the measurement operation of the measuring apparatus of the fifth embodiment and the stage position;

FIGS. 16A and 16B show the arrangement of a measuring apparatus according to Comparative Example 2 of the fourth and fifth embodiments, in which FIG. 16A is a perspective view, and FIG. 16B is a side view;

FIGS. 18A and 18B show the arrangement of a measuring apparatus according to the sixth embodiment, in which FIG. 18A is a perspective view.

FIGS. 19A to 19F are graphs for explaining the ground impedance, the number of opposing sensors, the ground current value, outputs from sensor amplifiers, an output from a compensator, and a compensation of a measurement error, in the measuring apparatus of the sixth embodiment;

FIGS. 24A to 24M are charts for explaining the relationship between the measurement operation of the X-ray exposure apparatus of the seventh embodiment and the stage position;

FIGS. 25A to 25J are graphs for explaining the ground current value, outputs from sensor amplifiers, and compensation amounts, in the X-ray exposure apparatus of the seventh embodiment;

DETAILED DESCRIPTION OF THE PREFERRED EMBODIMENTS

First Embodiment

Figure 1A:
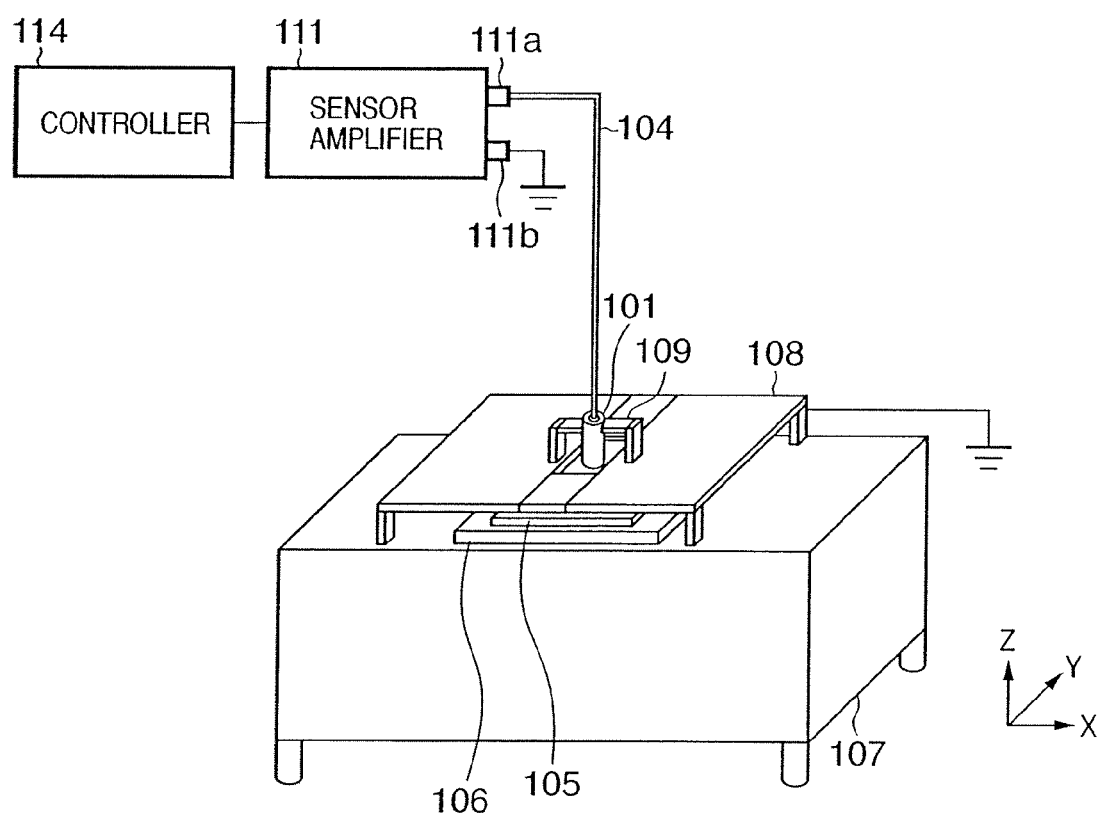
Figure 1B:
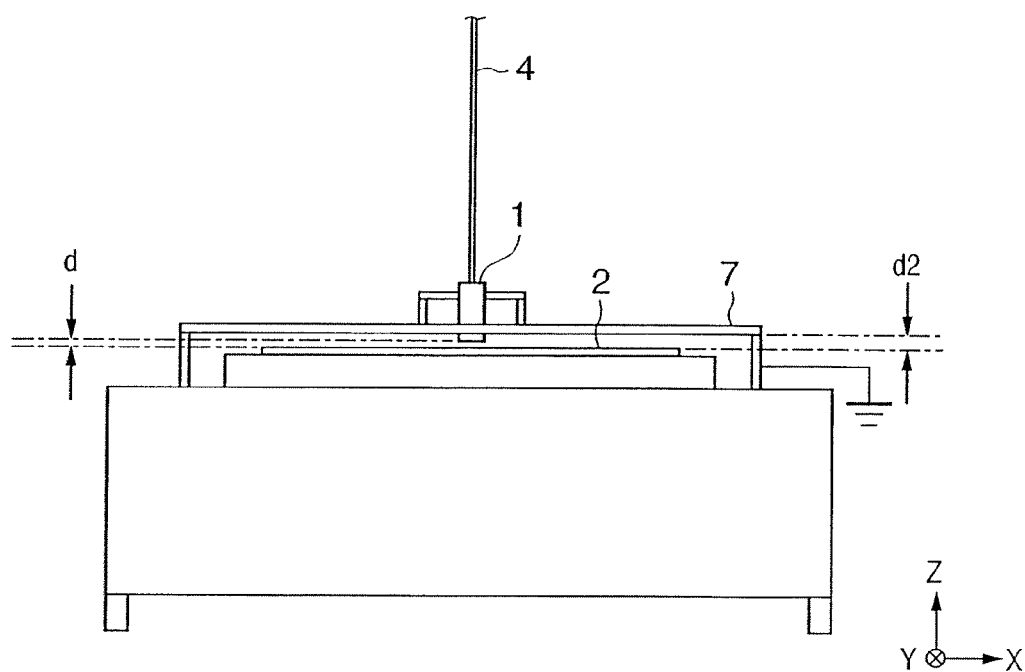

FIGS. 1A and 1B show the arrangement of a measuring apparatus using an electrostatic capacitance sensor according to the first embodiment. FIG. 1A is a perspective view; and FIG. 1B, a side view. More specifically, the apparatus comprises an electrostatic capacitance sensor (sensor probe) 101, a sensor amplifier 111, which is electrically connected to the sensor 101 via a connection cable 104, and a controller 114, which receives measurement values from the sensor amplifier 111. Weak AC currents from a terminal 111a of the sensor amplifier 111 are supplied from the sensor probe 101 to a target 105, such as a semiconductor wafer. A voltage drop by the impedance is measured to measure a distance d between the sensor probe and the target at measurement points on the target points.

Currents flowing from the sensor probe 101 to the target 105 flow back to a terminal 111b of the sensor amplifier via a conductor, which is set to be almost the same potential as that of the housing ground of the apparatus. In general, an electrostatic capacitance to be measured is a small value, on the pF order, and is readily influenced by the stray capacitance. The potential is usually set so as to reduce the influence of the stray capacitance on mounting from a sensor amplifier to a sensor probe and mounting from a target to a ground line.

As a chuck 106, an insulating vacuum chuck of SiC ceramic is employed.

The sensor probe 101 is held by an opposing ground plate 108 extending from a table (surface plate) 107 such that the sensor probe 101 opposes the surface of the target 105. The opposing ground plate 108 is also made of a conductor, such as a metal, and is connected to the ground.

The measuring apparatus measures the surface level and the inclination or undulation in the $\omega y$ direction (rotation about the Y-axis) of a semiconductor wafer serving as the target 105, which is vacuum-chucked on the chuck 106, by using the sensor probe 101 fixed so as to oppose the target 105.

The distance d between the sensor probe 101 and the target 105 will be referred to as a measurement gap. The setting of the measurement gap changes depending on the type of sensor probe. In this measuring apparatus, the measurement gap is set to be about 300 µm or less, and preferably, about 200 to 300 µm.

The sensor probe 101 is cylindrical and has a three-layered structure of a central electrode, a guard electrode, and an external electrode, concentrically from the center, when viewed from a radial section. An electrode used for measurement is the central electrode, which is connected to the central electrode terminal 111a of the sensor amplifier 111. A sine-wave constant-amplitude current of several tens of kHz is supplied from the sensor amplifier 111 to the central electrode. The current flows into a housing ground via the target 105, which is capacitively coupled to the sensor probe 101.

The housing ground is connected to the ground terminal 111b of the sensor amplifier 111. The sensor amplifier 111 detects a voltage across the central electrode terminal 111a and the ground terminal 111b, thereby measuring the impedance of a closed circuit including the capacitive impedance of the measurement gap.

Figure 2:
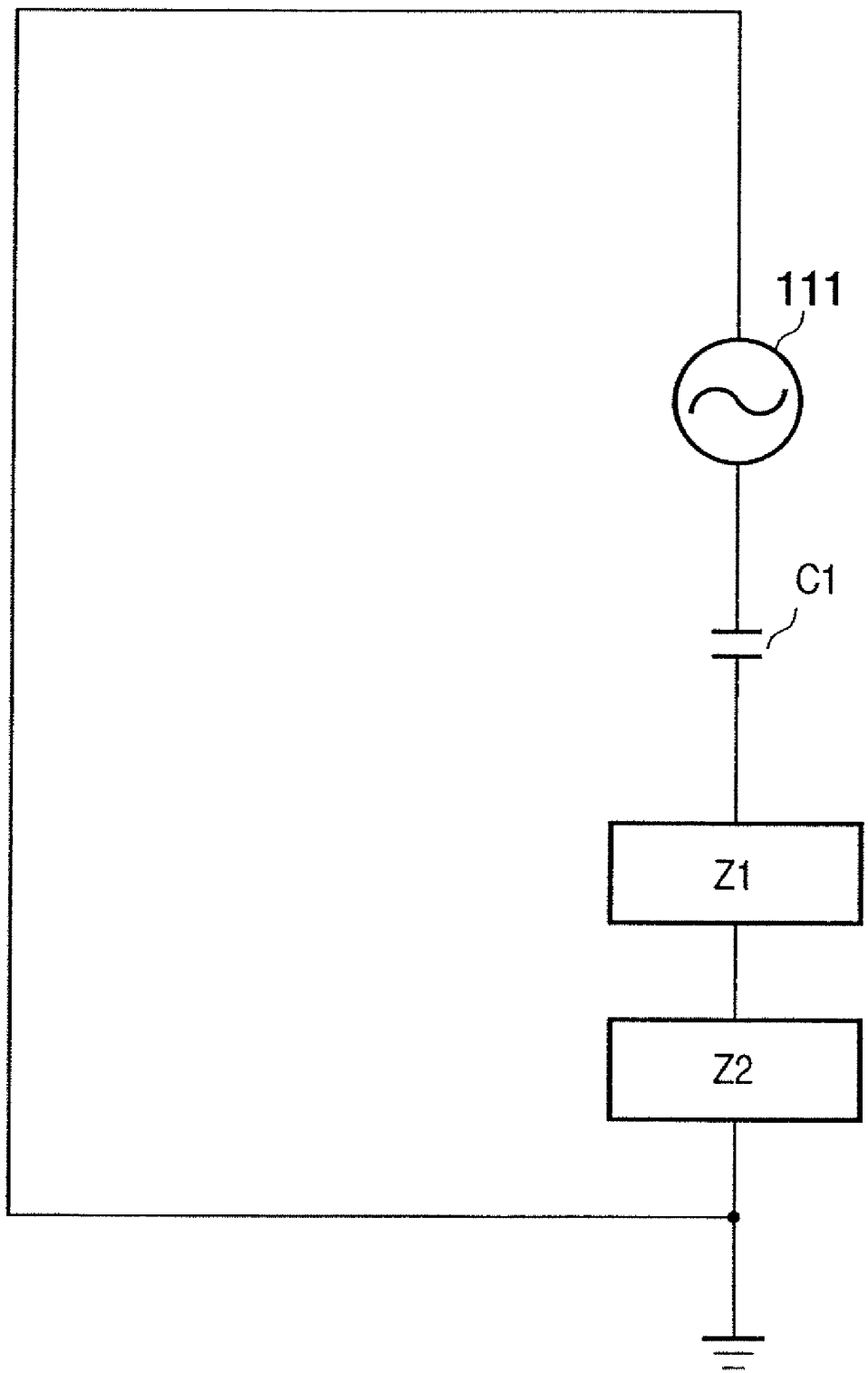
FIG. 2 is a circuit diagram of an equivalents circuit of the measuring apparatus shown in FIGS. 1A and 1B.

FIG. 2 shows the equivalent circuit of a measurement system in the measuring apparatus according to the first embodiment.

In FIG. 2, C1 represents the electrostatic capacitance caused by the measurement gap. Z1 represents the internal impedance of the semiconductor wafer serving as the target; and Z2, the impedance from the semiconductor wafer to the ground terminal.

Letting d be the measurement gap and S be the effective opposing area between the sensor probe and the target, an electrostatic capacitance C of the measurement gap is given by:

$$C = \epsilon 0 \cdot S/d$$

where $\epsilon 0$ is the permittivity in a vacuum. The permittivity in air is assumed to be almost equal to that in a vacuum.

Letting $\omega$ be the angular frequency of an AC current supplied to the sensor probe and i be the current value, a voltage value e between the central electrode terminal and the ground terminal is given by:

$$e = i/(\omega \cdot C).$$

From the two equations, $$e = i \cdot d/(\omega \cdot \epsilon 0 \cdot S); \text{ and}$$

$$d = e \cdot \omega \cdot \epsilon 0 \cdot S/i$$

are derived. Assuming that i, ω, and S do not change, d proportional to e is obtained.

The guard electrode is provided to prevent an electrical field generated by the central electrode from spreading to the periphery. The guard electrode is connected to the guard electrode terminal of the sensor amplifier. The guard electrode terminal is driven by a low-output-impedance driver at the same voltage as e. The sensor amplifier and sensor probe are connected using a coaxial cable. The central electrode is connected to the central wire of the coaxial cable, and the guard electrode is connected to the shield wire. This connection cancels the influence of the capacitance between two connection cables.

The sensor amplifier 111 drives the sensor probe and measures voltages. The measured voltages are A/D-converted and transmitted to the controller 114. For example, the controller 114 processes and displays measurement values. At this time, the offset, gain, nonlinearity, and the like, may be corrected in the controller 114.

In this embodiment, a table on which the target 105 is mounted is made up of the vacuum chuck 106 and surface plate 107. The vacuum chuck 106 is made of SiC ceramic in order to prevent deformation of the chuck upon a temperature change. The surface plate 107, on which the chuck 106 is mounted, is also made of ceramic. Most of the structure on the lower surface side of the target 105 is made of an insulator, and the target 105 is hardly expected to be coupled to ground.

Under the circumstances, in this embodiment, the opposing ground plate 108, which is the most important element of the present invention, is used to decrease the impedance between the target 105 and ground. This will be described below.

An interval d2 between the surface of the target 105 and the opposing ground plate 108 is set to be about 100 to 400 μm. In this embodiment, the opposing ground plate is arranged so as to cover the entire area of the target. Letting S2 be the projected area in which the target and opposing ground plate overlap each other, an electrostatic capacitance C2 between the target and the opposing ground plate is given by:

$$C2 = \epsilon 0 \cdot S2/d2.$$

C2 is desirably large. The electrostatic capacitance needs to be such that the impedance in the frequency of a current supplied to the sensor probe at the time of gap measurement is at least kept lower than that which attains a precision required for measurement.

Assume, for example, a case wherein C2/C=n. In this case, even if the impedance between the target 105 and ground in the absence of the opposing ground plate 108 varies between zero and infinity, the range of fluctuations in measurement value can be reduced to about 1/(n+1).

If most of the lower surface side of the target 105 is made of an insulator, as in this embodiment, the impedance between the target 105 and ground in the absence of the opposing ground plate 108 is very high, and the target 105 is grounded mainly by capacitive coupling to the opposing ground plate 108. In measuring the measurement gap d, which is almost constant, fluctuations in measurement value caused by, for example, fluctuations in internal impedance of the target 105 can be neglected, and n may be very small.

However, since a measurement value from the sensor amplifier 111 becomes n/(n+1) times, the lower limit value of n is limited by the precision or resolution in a measurement system, such as a sensor amplifier.

If the internal impedance of the target 105 greatly changes depending on the individual difference, DC/AC insulation of the chuck 106 side, as in this embodiment, may lead to a good result.

If the target is connected to ground from the chuck 106 side, an offset may occur in measurement values depending on the magnitude of the internal impedance. In measuring the surface level of the target, as in this embodiment, the offset causes an error. For example, the internal impedance of a GaAs wafer to be set at the time of manufacture has a wide range. The internal impedance can range from several Ω·cm to several M Ω·cm. It is difficult to precisely measure this by ground coupling on the chuck 106 side.

Under the circumstances, use of a ground plate, which is capacitively coupled from the side of a surface whose level is to be measured, as in this embodiment, can reduce the influence of the internal impedance on a measurement value.

According to this embodiment, even a measuring apparatus using an electrostatic capacity sensor whose target is hard to ground by the prior art techniques can decrease the ground impedance by using the opposing ground plate 108. In addition, the surface level of the target can be measured with little influence of the internal impedance of the target. A high-precision measuring apparatus can be formed at low cost so as to occupy less space.

The opposing ground plate 108 is connected to the ground terminal 111b of the sensor amplifier. The shape and size of the opposing ground plate 108, and the gap between the opposing ground plate 108 and the target at the time of measurement are so set as to keep the impedance by the capacitive coupling between the target and the ground member lower than that which attains a precision required for measurement in the frequency of the AC current. As described above, this embodiment is arranged to substantially ground the target 105 by capacitive coupling (AC coupling) between the target 105 and the opposing ground plate 108.

The target 105 is arranged in a DC/AC manner to have a high impedance with respect to the members other than the sensor probe 101 and opposing ground plate 108.

At least one of the target 105 and the sensor probe 101 may be mounted and be capable of moving on the stage.

The central electrode of the sensor probe 101 and the opposing ground plate 108 are insulated from each other, and the sensor probe 101 is short-circuited to the opposing ground plate 108 via a holding member 109 whose surface is conductive.

As the sensor probe 101, a plurality of sensor probes may be provided to measure a plurality of points, respectively, on the surface to be measured of the target 105.

Second Embodiment

Figure 3A:
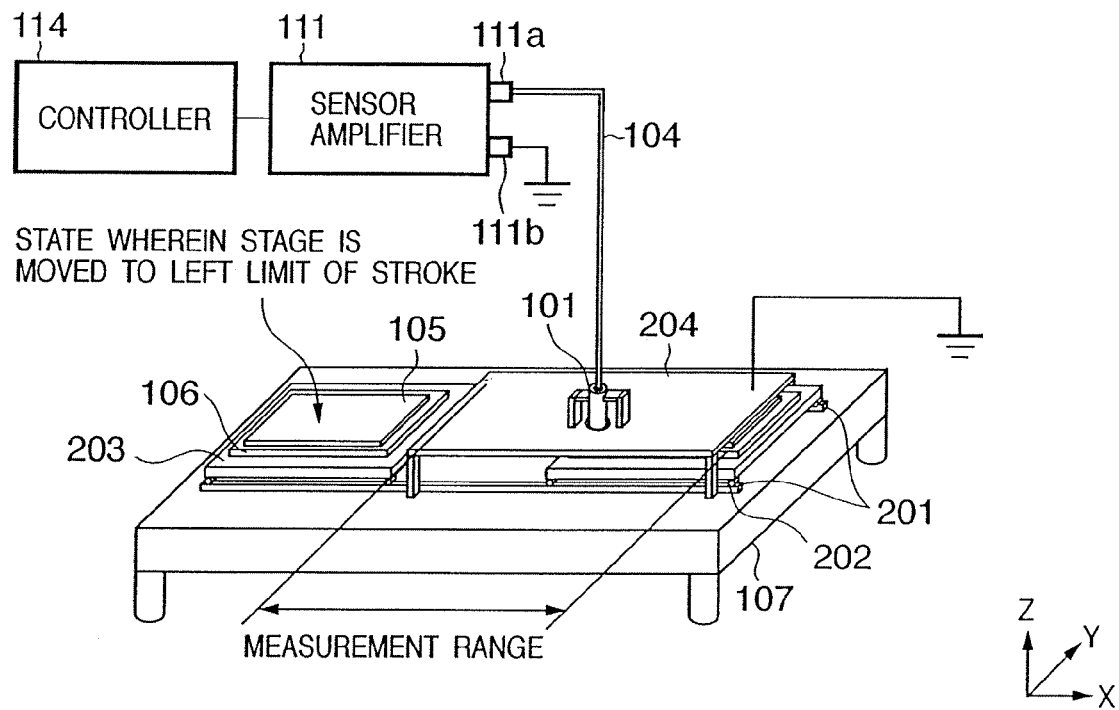
Figure 3B:
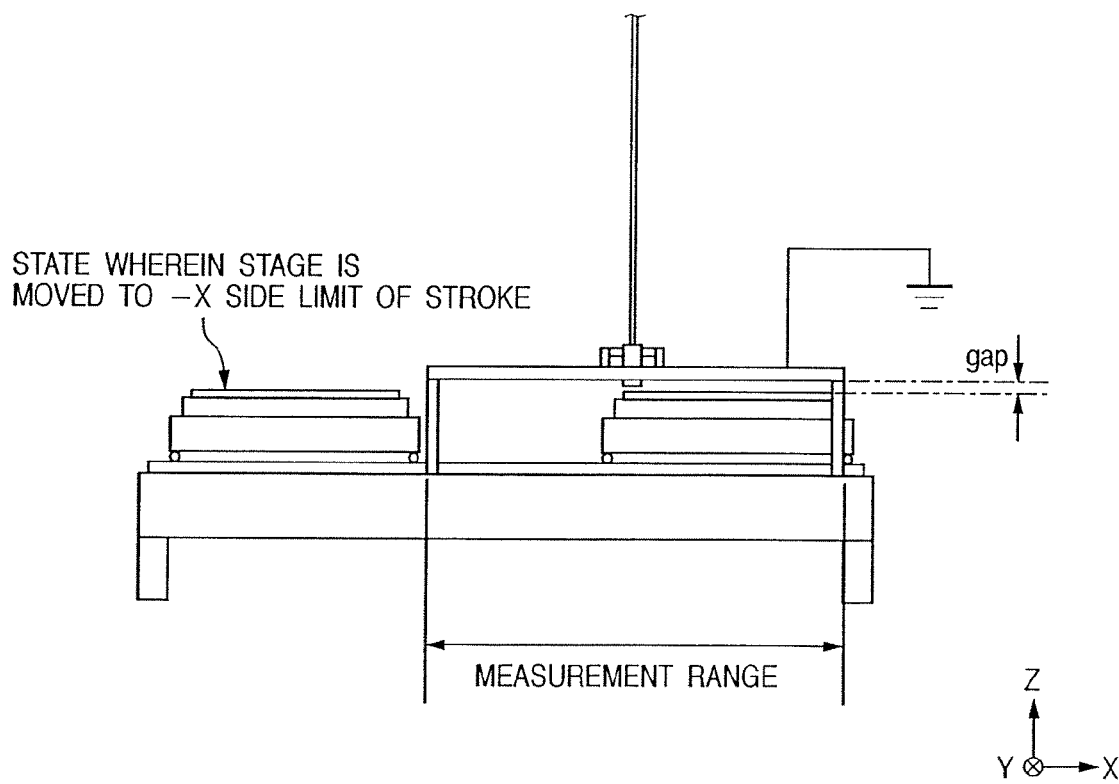

FIGS. 3A and 3B show the arrangement of a measuring apparatus using an electrostatic capacitance sensor according to the second embodiment. FIG. 3A is a perspective view; and FIG. 3B, a side view. Note that the same reference numerals as those in the first embodiment denote components having the same functions, and a description thereof will be omitted.

In the measuring apparatus shown in FIGS. 3A and 3B, two guide rails 201 are provided on a table 107 in parallel to each other, and sliders 202 are provided at the four corners on the lower surface of a stage 203, respectively. Each slider 202 is movable with respect to the corresponding guide rail 201.

The sensor probe 101 is held by an opposing ground plate 204 extending from the table 107 such that the sensor probe 101 opposes the surface of a target 105.

Note that FIG. 7 shows a measuring apparatus according to a modification of the second embodiment. The modification is different from the second embodiment in that opposing ground plates 161 are provided on a side in a direction of thickness of a target 162 and how the sensor probe 101 is attached. This arrangement is particularly effective if limited space on the side facing the sensor probe 101 of the target 162 cannot afford a ground panel, as described in the second embodiment.

In each of the above-mentioned embodiments, a case is described wherein the target is a substrate. Assume that the target is not a substrate, but is a three-dimensional object with a certain level. In this case, even if a ground panel is so arranged as to oppose the side surface of the target, a coupling effect on the ground can be obtained.

The modification may further decrease the ground impedance of a three-dimensional target. The modification not only can improve or increase the stability or precision of measurement, but also can eliminate an offset caused by the target. At the same time, the modification provides a higher degree of flexibility in apparatus layout.

Operation is almost equal to that of the second embodiment when the internal impedance of the target is relatively low.

Comparative Example 1 of the second embodiment will now be described.

Figure 5A:
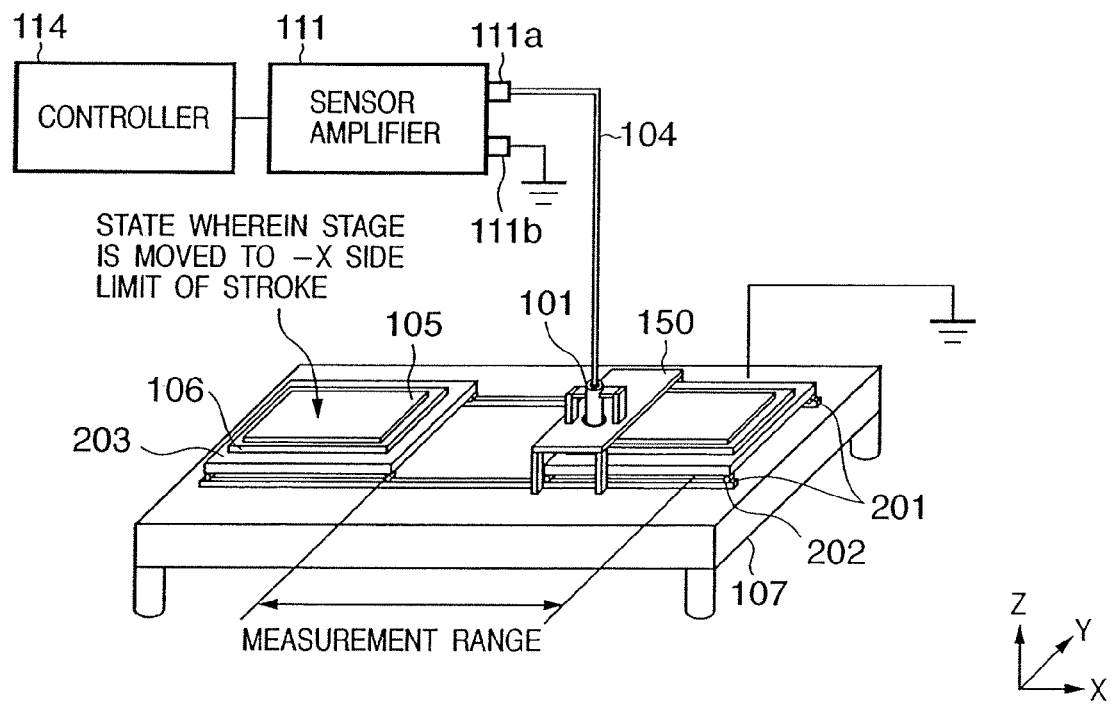
Figure 5B:
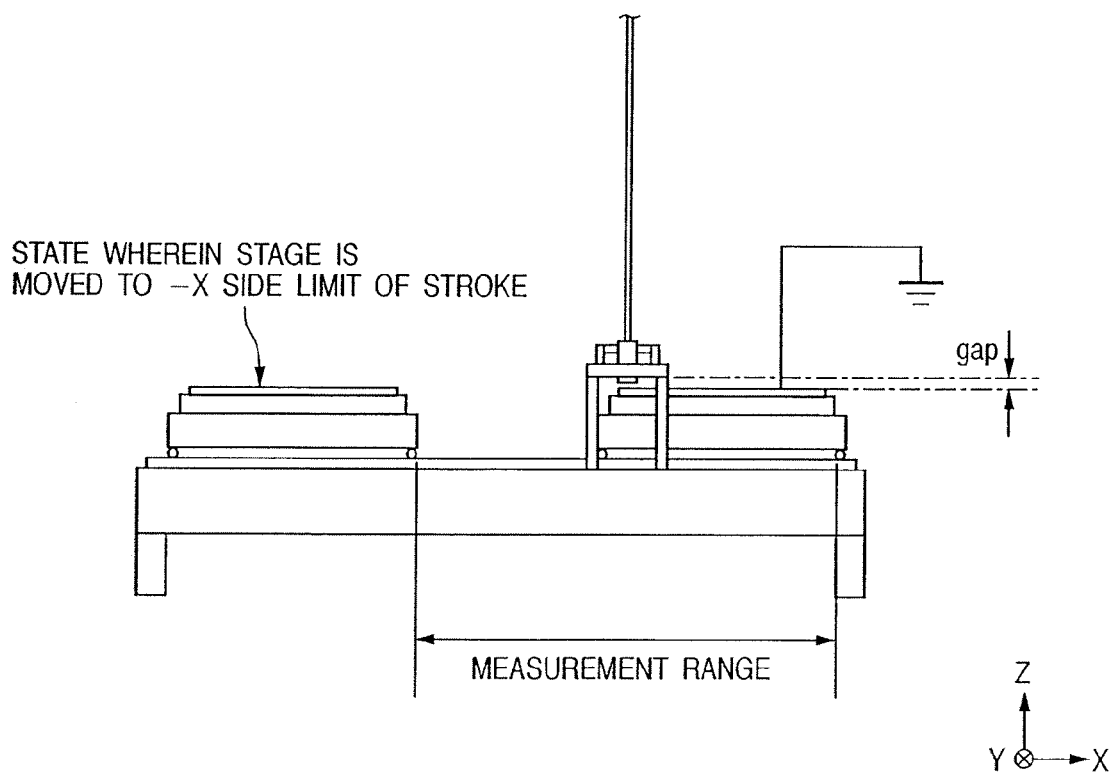

FIGS. 5A and 5B show the arrangement of a measuring apparatus using an electrostatic capacitance sensor according to Comparative Example 1. FIG. 5A is a perspective view; and FIG. 5B, a side view. Note that the same reference numerals as those in the second embodiment denote components having the same functions.

In the measuring apparatus shown in FIGS. 5A and 5B, the sensor probe 101 is fixed on a sensor holding frame 150. The stage 203, on which the target 105 is mounted, is moved to sequentially measure a plurality of measurement points.

However, in some cases, it is difficult to join the target 105 to ground by the target 105 at a low impedance. The cases include, for example, one wherein the shape of the target, the shape of the table, or the material for the table, is limited. In this case, the target cannot be coupled to ground at a low impedance by a conventional method. As a result, the stability or precision of measurement may degrade or decrease, or the target may cause an offset.

As the next best solution, the target and ground may capacitively be coupled. In this case, a change in coupling impedance between the target and ground during measurement results in erroneous measurement. The coupling impedance is likely to change, particularly in measurement while moving the sensor probe and the target relative to each other.

Occurrence of measurement errors due to a change in ground impedance of the measuring apparatus shown in FIGS. 5A and 5B will be described with reference to FIG. 6.

Capacitive coupling occurs between the target and the sensor holding frame. The impedance by the coupling depends on the opposing area and the interval. If the interval is constant, the impedance is inversely proportional to the area. In FIG. 6, a change in ground impedance generated by the sensor holding member is almost zero outside the measurement range, while it exhibits a value inversely proportional to the opposing area within the measurement range. If the sensor probe is of a constant-amplitude current type, a voltage drop due to a change in impedance is directly detected as an error. A measurement error as shown in FIG. 6 will occur by the prior art.

In the arrangement of FIGS. 5A and 5B, if the opposing electrode area or distance of a plate capacitor, which is formed between the target 105 and the opposing ground plate changes along with the movement of the target 105, the ground impedance will naturally change.

Under the circumstances, in this embodiment, the opposing ground plate is so arranged as to oppose the entire area of the target and to leave some margin in the entire stage movement range for measurement, as shown in FIGS. 3A and 3B. This can keep the ground impedance in any stage coordinates constant at the time of measurement.

Figure 4:
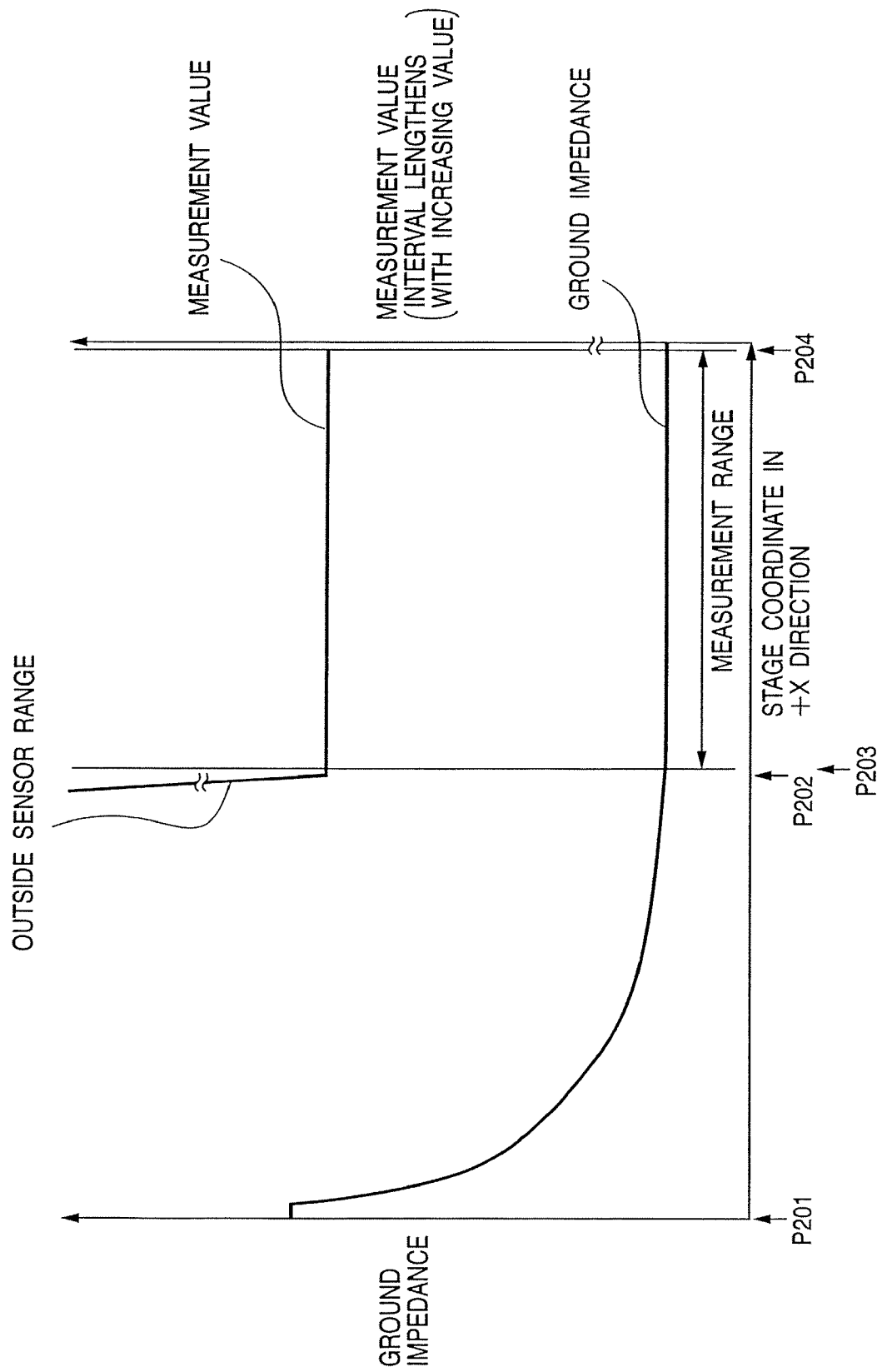
FIG. 4 is a graph showing the relationship between the ground impedance of the measurement error in the measuring apparatus of the second embodiment.

The relationship between the ground impedance and the measurement value in this embodiment will be described with reference to FIG. 4. The target is assumed to be completely flat, and the stage is assumed to completely translate, for the sake of descriptive simplicity.

In a state (P201), wherein the stage is moved to the −X side limit of the stage stroke, the target and the opposing ground plate do not overlap at all. The impedance by capacitive coupling between them becomes relatively high. As the stage moves in the +X direction from P201, the area in which the target and the opposing ground plate overlap increases. The overlapping area reaches the peak at a point (P202), slightly shifted from a measurement start point (P203) in the −X direction. When the stage moves further in the +X direction, the overlapping area remains at the peak until the stage reaches a point slightly shifted from a measurement end point (P204) in the +X direction. The coupling impedance between the target and the opposing ground plate is inversely proportional to the overlapping area, and is plotted as shown in FIG. 4. In this embodiment, the target falls outside the measurement points of the sensor probe outside the range from P202 to P204, and a measurement value falls outside the range. As seen from FIG. 4, the coupling impedance is constant within the measurement range. Accordingly, any change in ground impedance causes no error in a measurement value.

Third Embodiment

An X-ray stepper, which transfers a mask pattern onto a wafer by step and repeat, will be described as the third embodiment.

Figure 8:
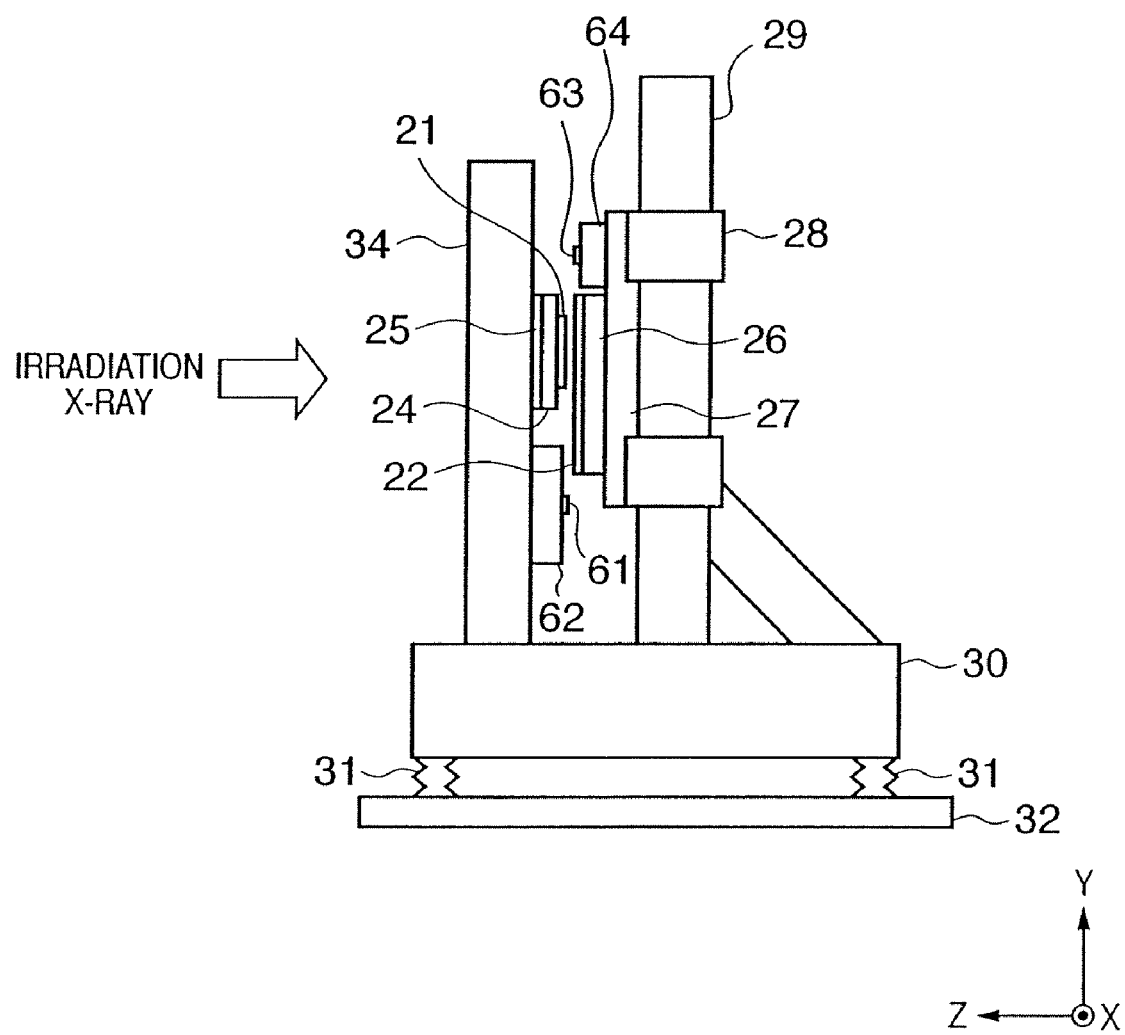
FIG. 8 is a view showing the arrangement of an X-ray exposure apparatus according to the third embodiment.

FIG. 8 shows a part of a proximity gap equal-magnification X-ray exposure apparatus using a synchrotron ring light source, that is, a part concerning an electrostatic capacitance sensor. In an actual apparatus, the part shown in FIG. 8 is incorporated in a sealed chamber, and used in a high-purity helium atmosphere at 20 kPa.

In this embodiment, exposure is done while a mask and a wafer are held at a very small gap, of 10 μm or less. High precision is required for measuring the levels of the wafer surface and mask surface. A set gap different from an assumed one results in serious influence on an exposure result, such as degradation of the line width accuracy. To realize high throughput, the wafer is exposed by a step and repeat process, while the exposure gap is maintained. At this time, low parallelism between the mask surface and the wafer surface may lead to degradation of an exposure result and damage to the mask membrane, due to its deformation.

Figure 9A:
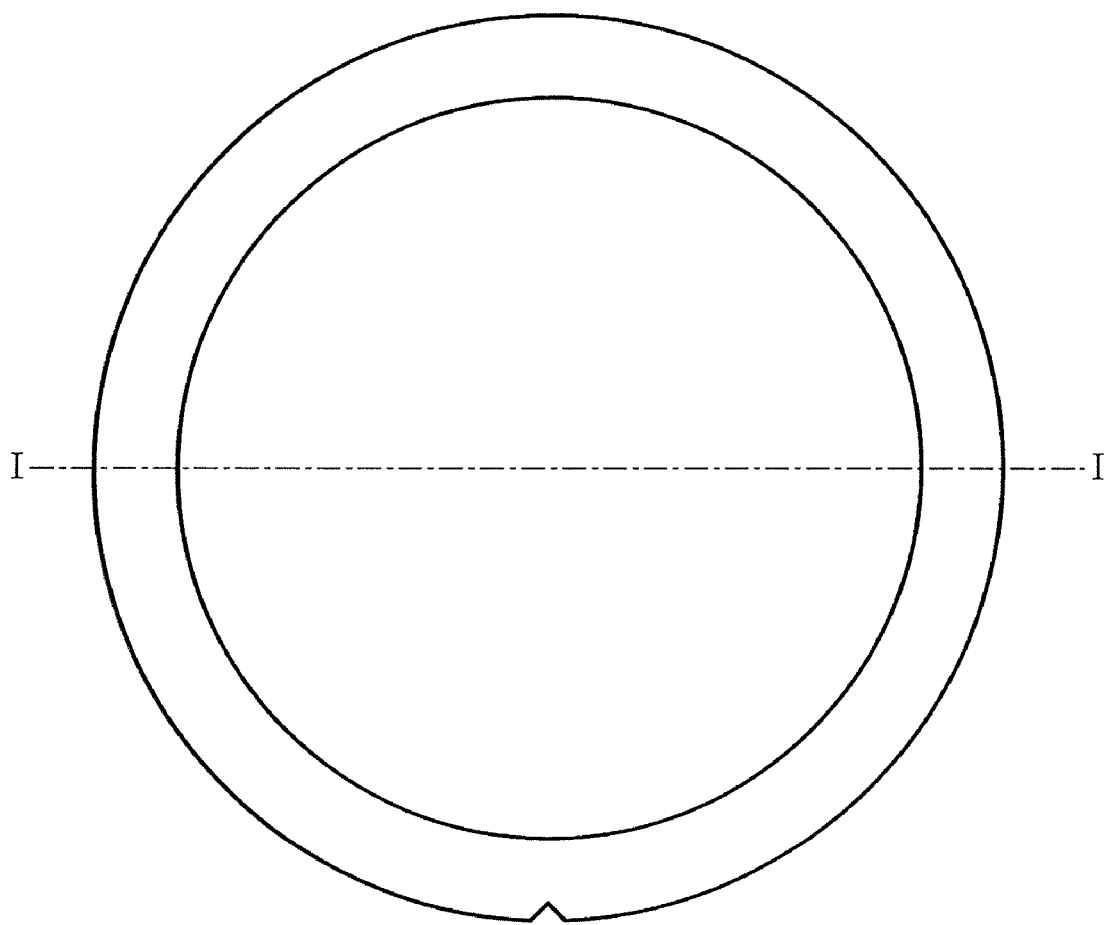
Figure 9B:
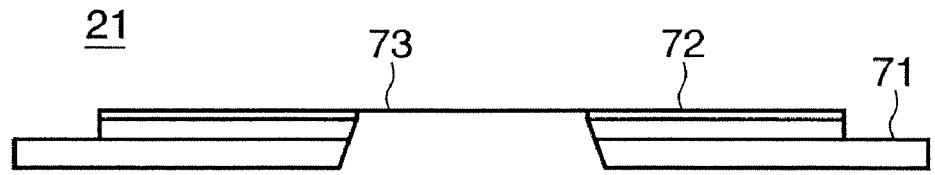

In this embodiment, an X-ray emitted by a synchrotron ring (not shown) is guided in a direction shown in FIG. 8. In synchronism with this, exposure is done while both a mask 21 and a wafer 22 are held vertically. FIGS. 9A and 9B show the structure of the mask 21. A mask frame 71 is made of SiC with a diameter of 125 mm. A 4" mask substrate 72 is bonded to the mask frame 71. A membrane 73 and an absorber pattern (not shown) are formed on the mask substrate 72. The mask substrate 72 is etched back in the exposure area. The mask is chucked by a mask chuck 24 shown in FIG. 8. The mask chuck 24 is mounted on a mask stage 25, and has the degree of freedom of movement around the Z-, θ-, ωx-, and ωy-axes. The mask stage 25 is mounted on a mask frame 34.

In FIG. 8, the wafer 22 is transferred onto a wafer stage 27 by a wafer transport system (not shown) and chucked on the wafer stage 27, that is, vacuum-chucked by a wafer chuck 26. The wafer chuck 26 is made of SiC, and has many small pins on the chuck surface. The wafer chuck 26 is mounted on the SiC wafer stage. The wafer stage 27 is mounted on an X stage 28, and further mounted on a Y stage 29. The Y stage is clamped to a surface plate 30. The surface plate 30 is set on a floor 32 via dampers 31, which cut off floor vibrations. The wafer stage 27 is driven by a linear motor, or the like, and has a degree of freedom around the X, Y, Z, θ, ωx, and ωy axes. The relative positions of the mask 21 and wafer 22 are measured by an alignment measuring unit (not shown).

Measurement by the electrostatic capacitance sensor according to this embodiment will be explained.

In FIG. 8, after the wafer 22 is chucked, the wafer stage 27 is driven to measure lattice points at a pitch of 20 mm on the wafer 22 by the electrostatic capacitance sensor. Since this embodiment has only one wafer measurement electrostatic capacitance sensor probe 61, measurement is done by driving the wafer stage 27 so as to cover all measurement points. In measurement, the wafer stage 27 need not be stopped. A controller (not shown) for the wafer stage 27 can perform measurement while managing measurement timings for coordinates and driving the wafer stage 27.

The wafer measurement electrostatic capacitance sensor probe 61 is attached to a metal member 62, which is attached to the mask frame 34 and also functions as an opposing ground plate. A mask measurement electrostatic capacitance sensor probe 63 is attached to a metal member 64, which is attached to the wafer stage 27 and also functions as an opposing ground plate. Both the metal members 62 and 64 are connected to the ground terminals of corresponding sensor amplifiers (not shown) by using conductors. The metal members 62 and 64 are set near the corresponding targets (the wafer 22 and the mask substrate 72 of the mask 21) with an area as large as possible in design so as to obtain capacitive coupling enough for opposing ground plates.

It is difficult to ground, without any mechanical influence, a substrate (e.g., the mask substrate 72 or wafer 22) supported by an insulator (e.g., the mask frame 71, wafer chuck 26, or wafer stage 27), as described in this embodiment. This embodiment can produce a grounding effect regardless of the material for and shape of a support member, and a chucking method.

If a plurality of wafer measurement electrostatic capacitance sensor probes are arranged at a pitch corresponding to that of measurement points so as to adapt to an increase in size of the wafer, the throughput can be increased. In this case, the installation space for sensors increases. The area of opposing ground members, which is the main point of the present invention, naturally increases, resulting in a further decrease in ground impedance.

The second embodiment can offer a small line width, high line width control precision, high throughput, and a compact, low-cost exposure apparatus, in semiconductor exposure/transfer. The use of a plurality of measurement sensors can increase the throughput, providing a high-productivity apparatus.

In the above-mentioned embodiments, the material for each of the surface plates 30 and 107, vacuum chuck 106, mask frame 34, mask chuck 24, wafer chuck 26, and wafer stage 27 may not be limited to a specific one. They are preferably made of a ceramic material of, for example, SiN, SiC, alumina, or any other material. The chucking method for the chucks 106, 24, and 26 may be a method of mechanically holding a target, rather than a vacuum-chucking method.

As described above, according to the above-mentioned embodiments, even a measuring apparatus using an electrostatic capacitance sensor whose target is hard to ground can decrease the ground impedance by using an opposing ground terminal. The distance between a target and a sensor probe can be measured with little influence of the internal impedance of the target. More specifically, an improvement or increase in the stability or precision of measurement, and elimination of an offset caused by the target, can be attained. A high-precision measuring apparatus can be formed at low cost so as to occupy less space.

As described in this embodiment, application of the measuring apparatus to a semiconductor exposure apparatus can offer a small line width, high line control precision, high throughput, and a compact, low-cost exposure apparatus in semiconductor exposure/transfer. The use of a plurality of measurement sensors can increase the throughput, providing a higher-productivity apparatus.

Fourth Embodiment

Figure 10A:
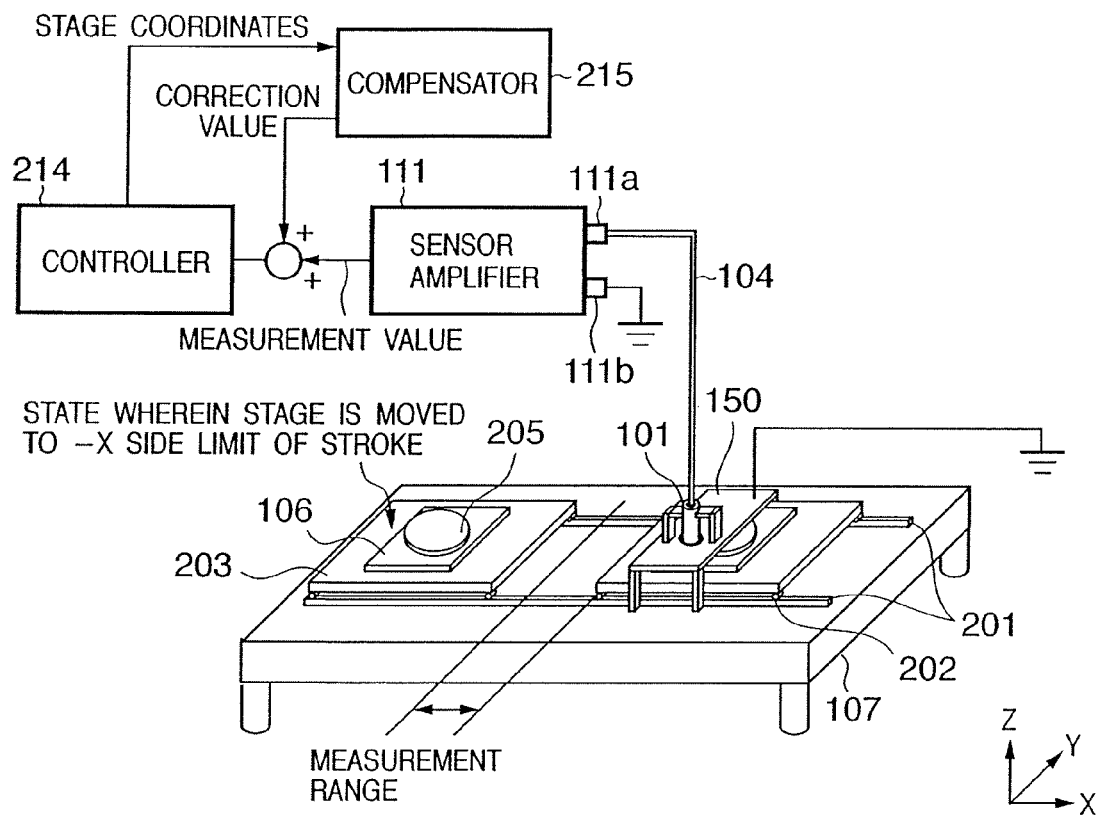
Figure 10B:
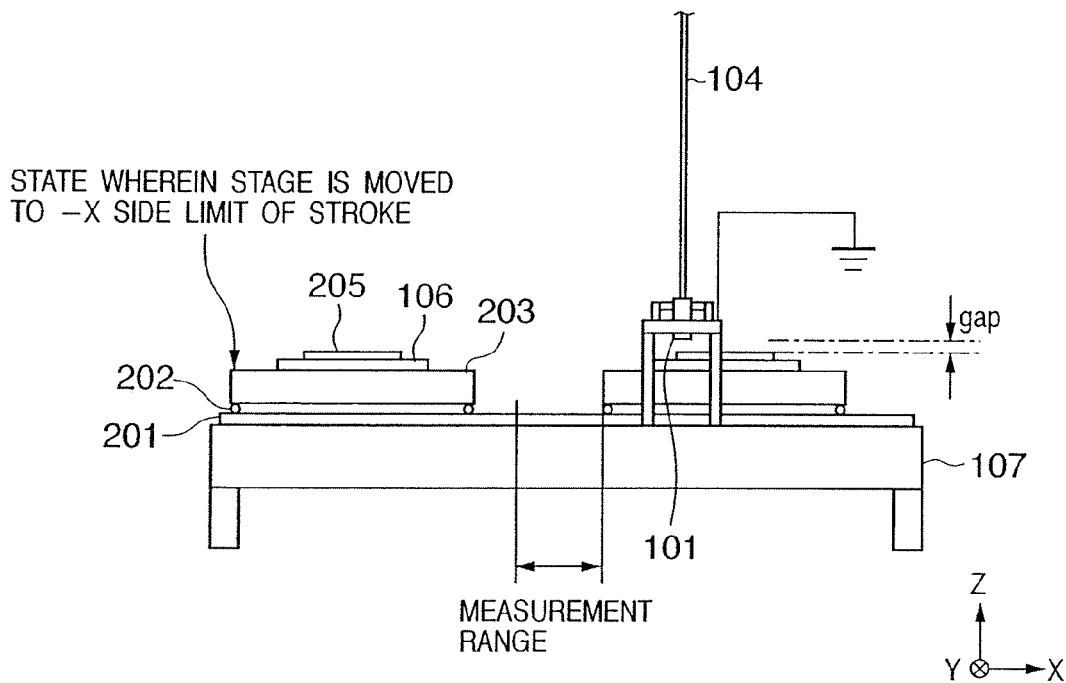

FIGS. 10A and 10B show the arrangement of a measuring apparatus using an electrostatic capacitance sensor according to the third embodiment. FIG. 10A is a perspective view; and FIG. 10B, a side view. Note that the same reference numerals as those in the second embodiment denote components having the same functions, and a description thereof will be omitted.

In the measuring apparatus according to this embodiment, a sensor probe 101 fixed on a sensor holding member 150 is used to measure at a plurality of measurement points the surface level of a semiconductor wafer 205, which is vacuum-chucked on a vacuum chuck 106 made of SiC ceramic and serves as a target.

The measuring apparatus of this embodiment comprises a compensator 215 to compensate for measurement values from a sensor amplifier 111. An output from the sensor amplifier 111 and an output from the compensator 215 are added together and input to a controller 214.

The controller 214 informs the compensator 215 of the coordinate value of the current position of a stage, and the compensator 215 outputs a correction value corresponding to the coordinate value. The compensator 215 comprises a nonvolatile memory and stores the relationship between the current coordinate value of the stage and the correction value as a table specific to the apparatus. As the relationship between the current stage coordinate value and the correction value, data obtained in advance by calibration operation is used.

The relationship between the ground impedance and the measurement value in this embodiment will be described with reference to FIGS. 11A to 11C. The target 205 is assumed to be completely flat, and a stage 203 is assumed to completely translate for the sake of descriptive simplicity. The assumption is solely aimed at descriptive simplicity, and is not intended to limit the technical scope of the present invention.

In the measuring apparatus according to this embodiment, capacitive coupling occurs between the target 205 and the sensor holding member 150. The impedance by the coupling depends on the interval and the opposing area in which the target 205 and the sensor holding member 150 overlap each other. If the interval is constant, the impedance is inversely proportional to the area.

Figure 11A:
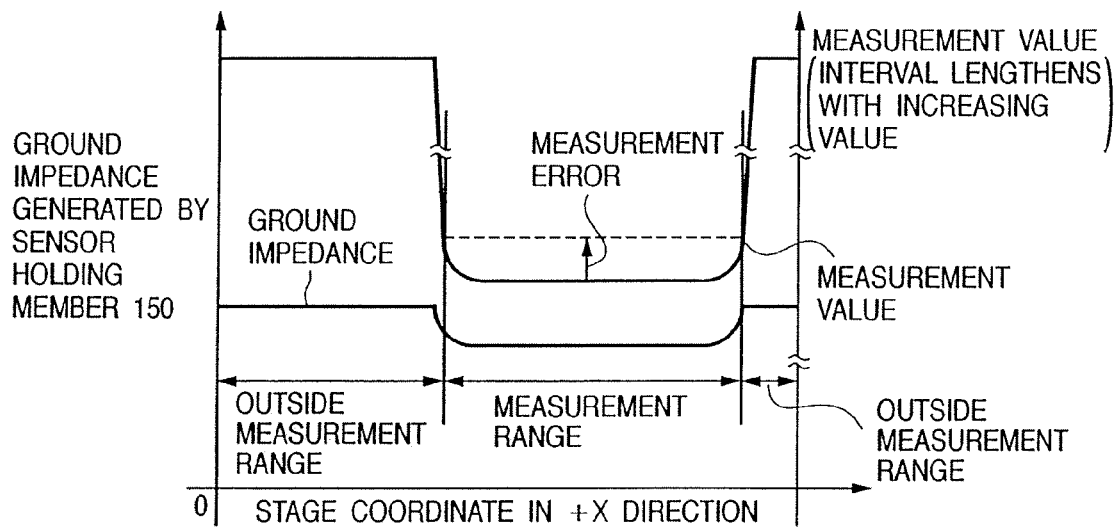
FIGS. 11A to 11C are views for explaining an output from a sensor amplifier, an output from a compensator, and compensation of a measurement error, in the measuring apparatus of the fourth embodiment.
Figure 11B:
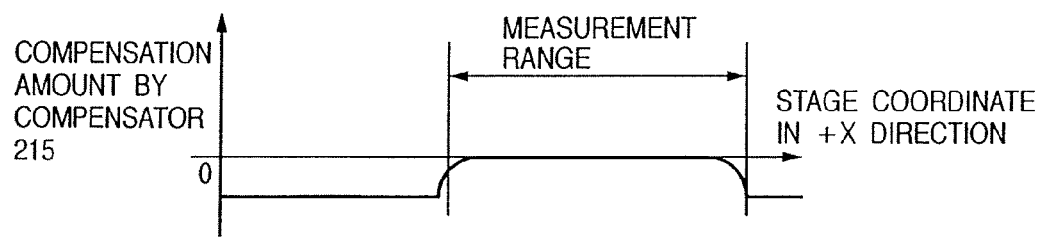
Figure 11C:
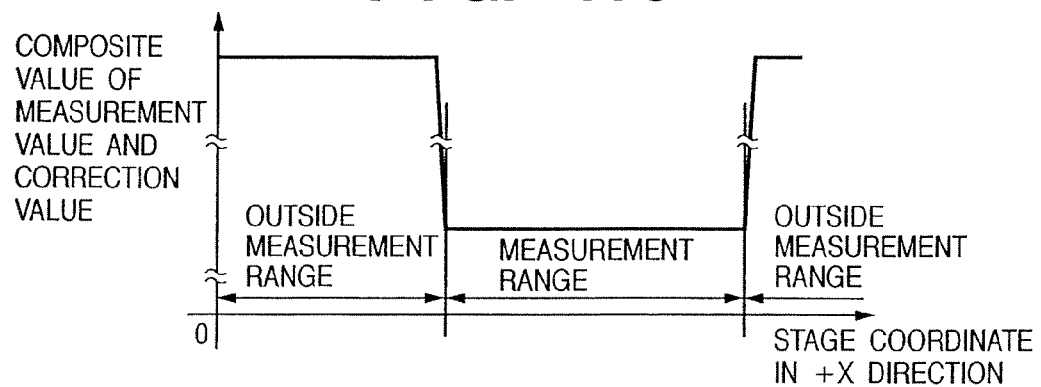

In FIG. 11A, a change in ground impedance generated by the sensor holding member 150 is almost zero outside the measurement range, while it exhibits a value inversely proportional to the opposing area within the measurement range. If the sensor probe is of a constant-amplitude current type, a voltage drop due to the change in impedance is directly output as an error from a sensor amplifier 211. To cancel the error, a correction value shown in FIG. 11B is output from the compensator 215. Consequently, a value (composite value) from which the influence of the ground impedance is eliminated is input to the controller 214, as shown in FIG. 11C. The controller 214 uses the composite value as a measurement result of the measuring apparatus.

A method of obtaining in advance the relationship between the stage coordinate value and the correction value will be described.

The semiconductor wafer 205 is aligned with an aligning pin (not shown) on the chuck 106. Thus, the positional relationship between the semiconductor wafer 205 and the chuck 106 is reproducibly kept even when the wafer is replaced with another one. In this embodiment, a change in ground impedance mainly causes a voltage drop at a ground impedance portion to change along with the stage coordinates. This change is caused by a change in opposing area of the sensor holding member 150 and the semiconductor wafer 205. The opposing area with respect to the stage coordinates can be obtained by geometrical calculation. The interval between the sensor holding member 150 and the semiconductor wafer 205 can be kept constant. Hence, the electrostatic capacitance of a plate capacitor, which uses them as electrodes, can be obtained by calculation. Since the frequency and current value of a constant-amplitude AC signal supplied from the sensor probe 101 are already known, the impedance and the voltage drop by the electrostatic capacitance can be obtained. The voltage drop can be converted to a distance correction value using a voltage-to-distance conversion factor. Consequently, the compensation amounts for measurement values influenced by a voltage drop at the ground impedance portion can be associated with the stage coordinates in the form of a table.

In this embodiment, the compensator 215 is provided separately from the controller 214 and sensor amplifier 111. However, this arrangement is merely an example which achieves the present invention. For example, the compensator can be integrated into the controller 214, depending on the design. In this embodiment, the compensator 215 stores the current stage coordinate values and compensation amounts as an associated table. The present invention is not limited to this table, and may define arithmetic expressions to achieve the object.

In this embodiment, the ground impedance is obtained by geometrical calculation, but it can be obtained by measurement. For example, a semiconductor wafer having a conductive film on its surface is prepared, and the electrostatic capacitance between ground and the wafer surface, or the impedance in the same frequency as that of the sensor, can be measured by a measuring apparatus.

In this embodiment, the value of a current supplied to the ground impedance is assumed to be equal to the output current value of the sensor probe 101. The current value can be measured more accurately by inserting an ammeter between the sensor holding member 150 and ground.

In this embodiment, the interval between the sensor holding member 150 and the semiconductor wafer 205 is constant, regardless of the stage coordinates. The interval may not be constant, for example, when the sensor holding member 150 is inclined with respect to the movement of the stage 203. The parallelism or the nonuniformity of the thickness of the semiconductor wafer 205 is less significant than the interval, and can be neglected.

If the interval is not constant with respect to the stage coordinates, the ground impedance is preferably obtained by measurement. This enables detection of the main factor due to a change in opposing area.

Fifth Embodiment

The fifth embodiment in which a measuring apparatus is applied to measurement of the position of a semiconductor wafer will be described below.

Figure 12A:
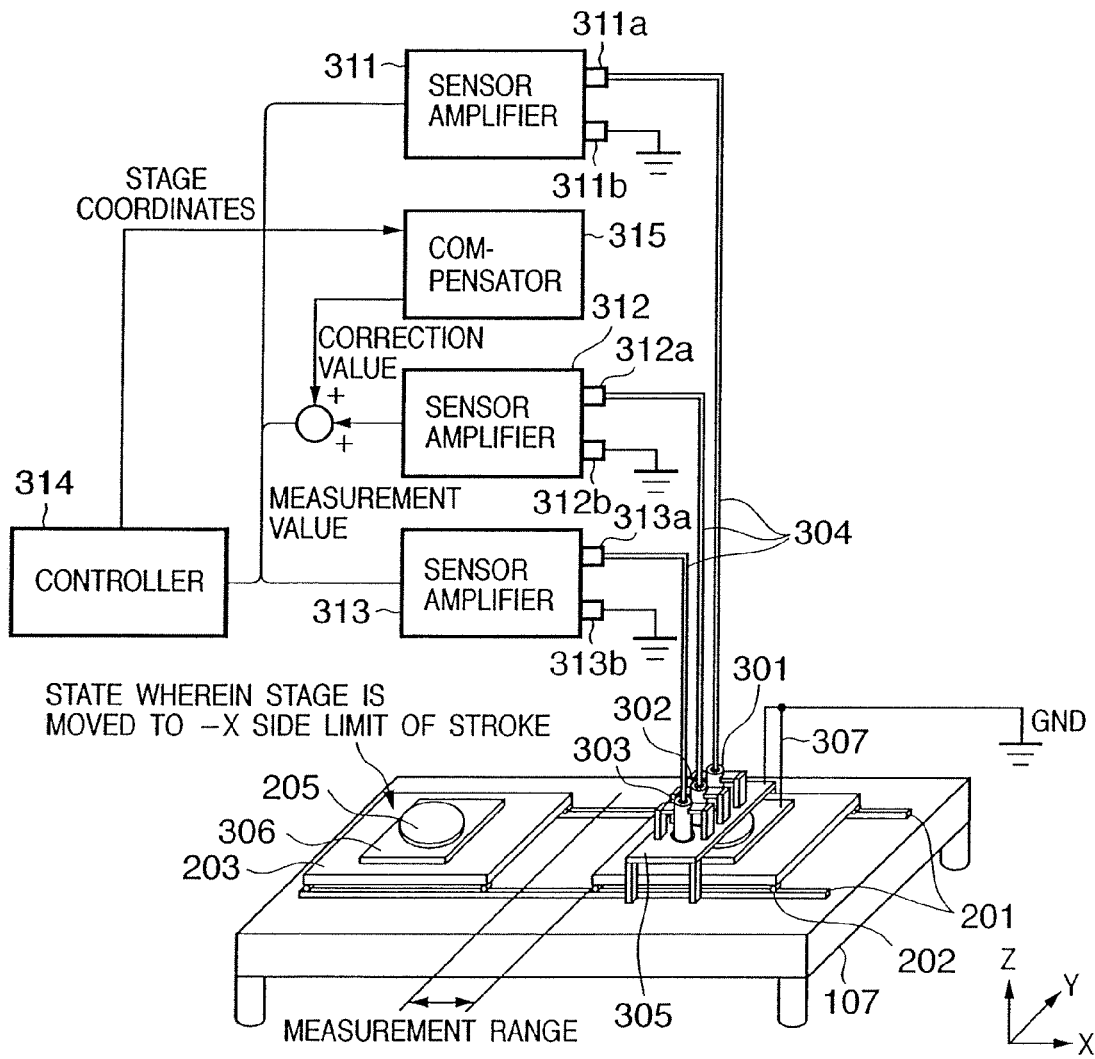
Figure 12B:
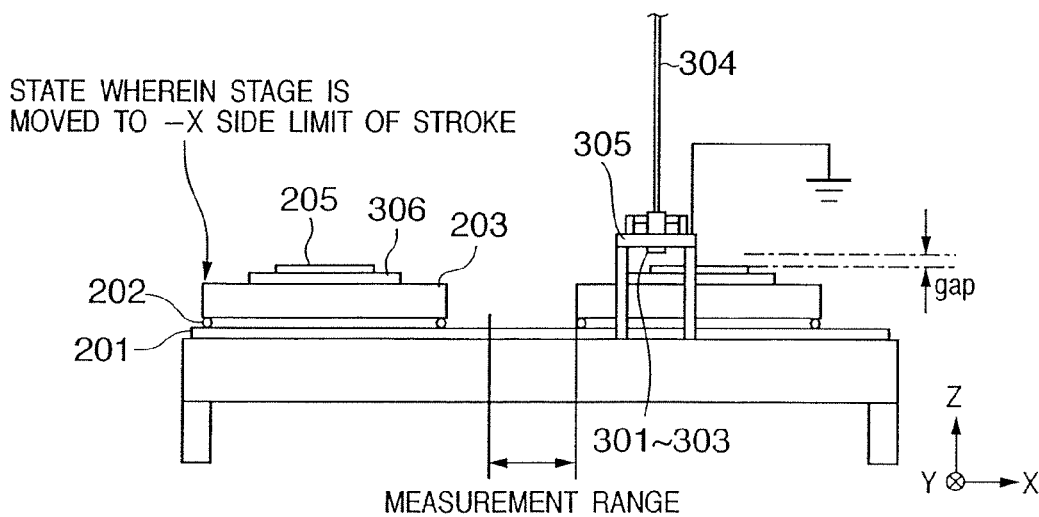

FIGS. 12A and 12B show the arrangement of a measuring apparatus according to the fifth embodiment of the present invention. The same reference numerals as those in the fourth embodiment shown in FIGS. 10A and 10B denote the same components.

The measuring apparatus according to this embodiment measure the surface level of a semiconductor wafer 205, serving as a target, which is vacuum-chucked on a conductive vacuum chuck 306 at a plurality of measurement points by using a plurality of (e.g., three) sensor probes 301 to 303 fixed on a sensor holding member 305.

The sensor probes 301 to 303 each have a three-layered structure of a central electrode, a guard electrode, and an external electrode concentrically from the center, when viewed from a radial section. Electrodes used for measurement are the central electrodes, and the central electrodes are connected to central electrode terminals 311a to 313a of the respective sensor amplifiers 311 to 313.

Housing ground is connected to ground terminals 311b to 313b of the respective sensor amplifiers 311 to 313, forming a closed circuit as a whole. The sensor amplifiers 3111 to 313 detect voltages between the central electrode terminals 311a to 313a and the ground terminals 311b to 313b, thereby measuring the impedance of the closed circuit including the capacitive impedance of the measurement gap.

The sensor amplifiers 311 to 313 drive the sensor probes and measure voltages. The measured voltages are A/D-converted and transmitted to a controller 314. For example, the controller 314 processes and displays measurement values.

The vacuum chuck 306 is made of a conductive material. However, it may be made of a metal or formed by plating the surface of an insulating material, such as ceramics. The conductive chuck 306 is connected to ground via a cable 307. As for the coupling between the semiconductor wafer 205 and ground GND in this embodiment, the coupling between the semiconductor wafer 205 and the conductive chuck 306 is dominant. In other words, the coupling between the target 205 and the conductive chuck 306 has the lowest impedance, and coexistent capacitive coupling at other portions can almost be neglected.

The measuring apparatus of this embodiment comprises a compensator 315 to compensate for measurement values from the sensor amplifier 312. An output from the sensor amplifier 312 and an output from the compensator 315 are added together and input to the controller 314.

The controller 314 informs the compensator 315 of the coordinate value of the current position of a stage, and the compensator 315 outputs a correction value corresponding to the coordinate value. The compensator 315 comprises a nonvolatile memory and stores the relationship between the current coordinate value of the stage and the correction value as a table specific to the apparatus. As the relationship between the current stage coordinate value and the correction value, data obtained in advance by a calibration operation is used.

Since the frequency and current value of a constant-amplitude AC signal supplied from the sensor probe 302 are already known, the impedance and the voltage drop by the electrostatic capacitance can be obtained. The voltage drop can be converted to a distance correction value using a voltage-to-distance conversion factor of the sensor amplifier 312. Consequently, the compensation amounts for measurement values influenced by a voltage drop at the ground impedance portion can be associated with the stage coordinates in the form of a table.

Figure 14:
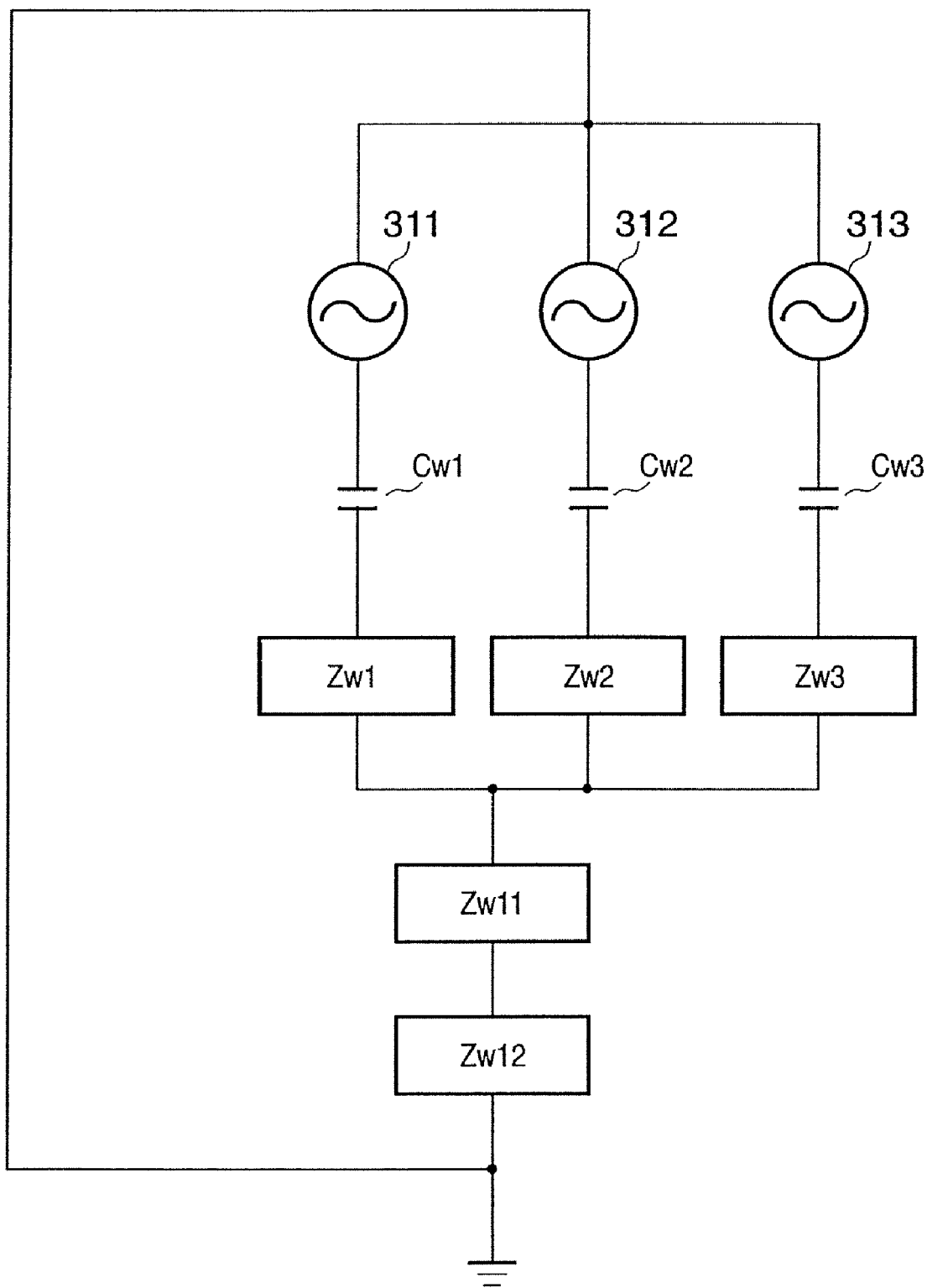
FIG. 14 is a circuit diagram showing the equivalent circuit of the measuring apparatus in FIGS. 12A and 12B.

FIG. 14 is a circuit diagram showing the equivalent circuit of a measurement system in the measuring apparatus.

In FIG. 14, Cw1 to Cw3 represent the electrostatic capacitances caused by the measurement gaps for the sensor probes 301 to 303, respectively. Of impedances inside the semiconductor wafer, Zw1 to Zw3 are independent terms, and Zw11 is a common term, for the sensor probes 301 to 303. Zw12 is the impedance from the semiconductor wafer to the ground terminal. In this embodiment, resistive or capacitive coupling occurs between the semiconductor wafer and the metal chuck. For this reason, Zw12 is expected to be smaller than Zw1 in the first embodiment.

The relationship between a measurement operation using the above-mentioned measuring apparatus and the stage position will be described with reference to FIGS. 15A to 15G.

The measuring apparatus continuously moves a stage 203 on which the target (semiconductor wafer) 205 is mounted at a constant velocity from the +X direction (the right end side of a table 107) to the −X direction (the left end side of the table) shown in FIGS. 12A and 12B, thereby performing measurement.

More specifically, as the stage 203, which has been in a pre-measurement state of FIG. 15A, moves in the −X direction, the semiconductor wafer first falls on the measurement position of the central sensor probe 302. The central sensor probe 302 starts measurement (FIG. 15B).

Then, the semiconductor wafer falls on the measurement positions of the respective sensor probes 301 and 303 on both sides. Both the sensor probes 301 and 303 start measurement (FIG. 15C).

The three sensor probes 301 to 303 start measuring the central portion of the wafer, as shown in FIG. 15D.

The semiconductor wafer then separates from the measurement points of the respective sensor probes 301 and 303 on both sides, and both the sensor probes 301 and 303 end measurement (FIG. 15E). The semiconductor wafer separates from the measurement position of the central sensor probe 302, and the central sensor probe 302 ends measurement. When the semiconductor wafer is separated from all the measurement points of the respective sensor probes 301 to 303, measurement ends (FIG. 15G).

The states of FIGS. 15A to 15G show the relative positional relationships between the stage 203 (i.e., the semiconductor wafer) and the sensor probes 301 to 303. In practice, measurement is continuously performed at other stage positions.

The relationship between the ground current value and the measurement value in this embodiment will be described with reference to FIGS. 13A to 13G. The target 205 is assumed to be completely flat, and the stage 203 is assumed to completely translate, for the sake of descriptive simplicity. Points (a) to (g) on each abscissa correspond to the stage positions in FIGS. 15A to 15G, respectively.

As described above, the impedance between the target 205 and ground can be considered to be the impedance between the target 205 and the chuck 306, and is almost constant regardless of any movement of the target 205. The ground impedance is a common impedance among the three sensor probes 301 to 303.

Figure 13A:
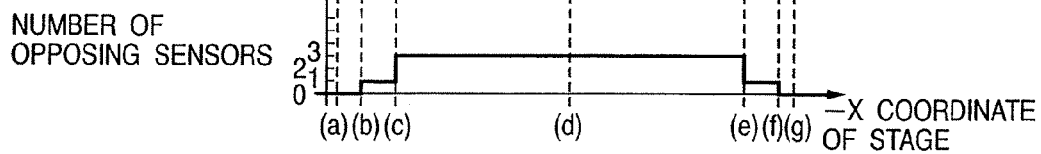
FIGS. 13A to 13G are graphs for explaining the number of opposing sensors, the ground current value, outputs from sensor amplifiers, an output from a compensator, and compensation of a measurement error, in the measuring apparatus of the fifth embodiment.
Figure 13B:
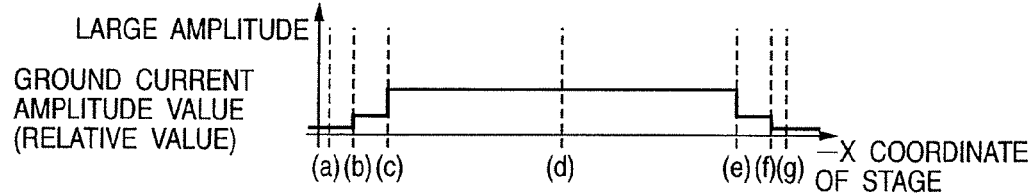
Figure 13C:
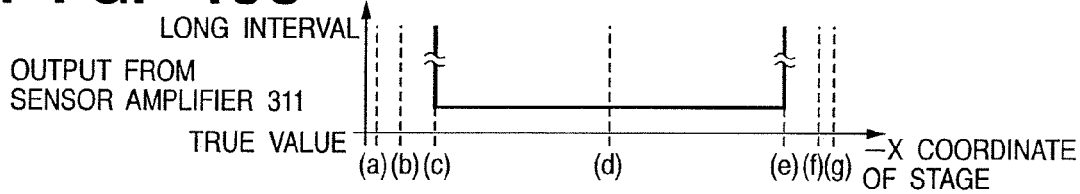

In FIG. 13B, a ground current flows in accordance with the number of sensors opposing the target 205 shown in FIG. 13A. If the sensor probes 301 to 303 are of a constant-amplitude current type, voltage drops by the ground current are directly output as errors from the sensor amplifiers 311 to 313, respectively. In the sensor amplifiers 311 to 313, the ground current does not vary within the measurement range, as shown in FIGS. 13C and 13E, and an output from each sensor amplifier is directly used as an input to the controller 314. Offsets of the sensor amplifiers 311 and 313 can be calibrated upon offset calibrations such as the measuring apparatus.

Figure 13D:
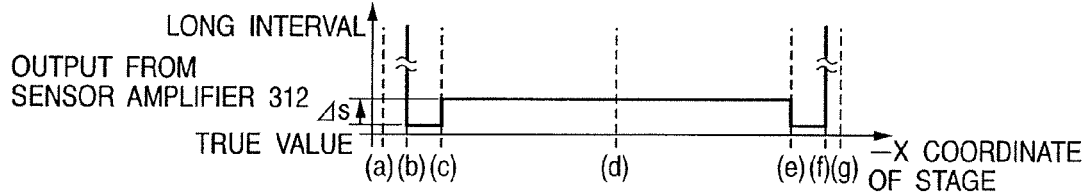
Figure 13E:
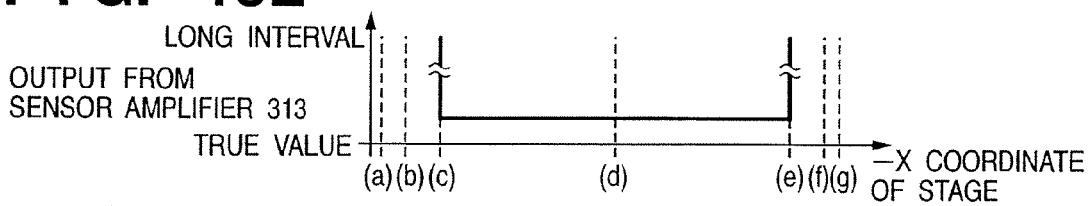
Figure 13F:
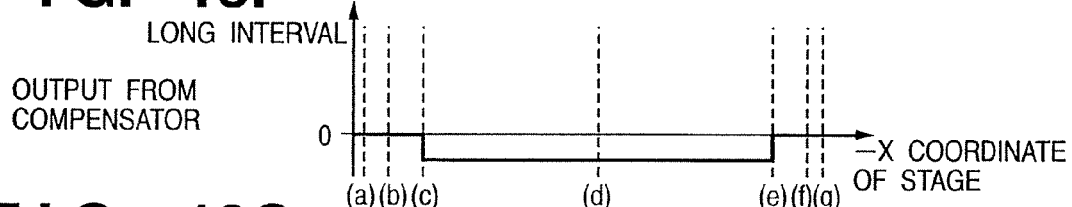
Figure 13G:
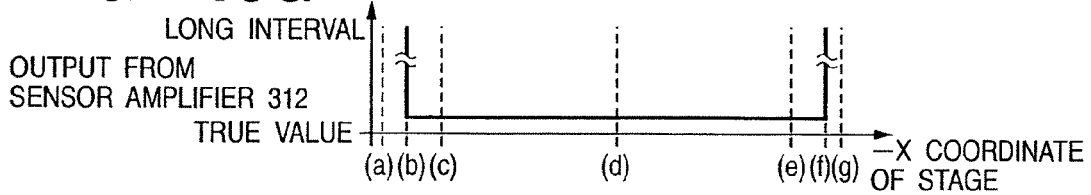

An output from the sensor amplifies 312 contains an error ΔS shown in FIG. 13D. To cancel the error ΔS, a correction value shown in FIG. 13F is output from the compensator 315. The output and an output from the sensor amplifier 312 are added together and input to the controller 314. Consequently, a value (composite value) from which the influence of the ground impedance is eliminated is input to the controller 314, as shown in FIG. 13G. The controller 314 uses the composite value as a measurement result of the measuring apparatus.

A method of obtaining in advance the relationship between the stage coordinate value and the correction value will be described.

The semiconductor wafer 205 is aligned with an aligning pin (not shown) on the chuck 306. Thus, the positional relationship between the semiconductor wafer 205 and the chuck 306 is reproducibly kept, even when the wafer is replaced with another one. In this embodiment, a change in ground impedance mainly causes a voltage drop at a ground impedance portion to change along with the stage coordinates. This change is caused by a change in the number of sensors opposing the semiconductor wafer 205. The number of opposing sensors with respect to the stage coordinates can be obtained by geometrical calculation. The ground impedance can be obtained by measurement. The voltage drop in the ground impedance can be obtained from the current value and ground impedance. The voltage drop can be converted to a distance correction value using a voltage-to-distance conversion factor of the sensor amplifier 312. Consequently, the compensation amounts of measurement values influenced by a voltage drop at the ground impedance portion can be associated with the stage coordinates in the form of a table.

In this embodiment, the compensator 315 is provided separately from the controller 314 and sensor amplifiers 311 to 313. However, this arrangement is merely an example which achieves the present invention. For example, the compensator can be integrated into the controller 314 depending on the design. In this embodiment, the compensator 315 stores the current stage coordinate values and compensation amounts as an associated table. The present invention is not limited to this table, and may define arithmetic expressions to achieve the object.

This embodiment has one sensor amplifier to be compensated. However, compensation can be performed in the same manner with a plurality of sensor amplifiers.

The conductive chuck 306 of this embodiment is made of a conductive material. It may be made of a metal or formed by plating the surface of an insulating material, such as ceramics.

In this embodiment, the value of a current supplied to the ground impedance is obtained by geometrical calculation. The current value can be measured more accurately by inserting an ammeter between the sensor holding frame and ground.

In this embodiment, the ground current and ground impedance are separately calculated, and a correction value is obtained by estimating a voltage drop from them. Alternatively, the voltage drop can directly be measured. For example, the stage is moved to the center of the measurement range and stopped. The sensor probes 301 and 303 are separated from the sensor amplifiers 311 and 313, respectively, while the sensor probe 302 remains connected to the sensor amplifier 312. In this state, a measurement value (assumed to be A) is obtained from the sensor probe 302. Then, a measurement value (assumed to be B) is obtained from the sensor probe 302, while the sensor probes 301 to 303 are connected to the respective sensor amplifiers 311 to 313. A difference between A and B corresponds to a difference in voltage drop at the ground impedance portion between one opposing sensor and three opposing sensors.

Comparative Example 2 of the fourth and fifth embodiments will be described.

Figure 16A:
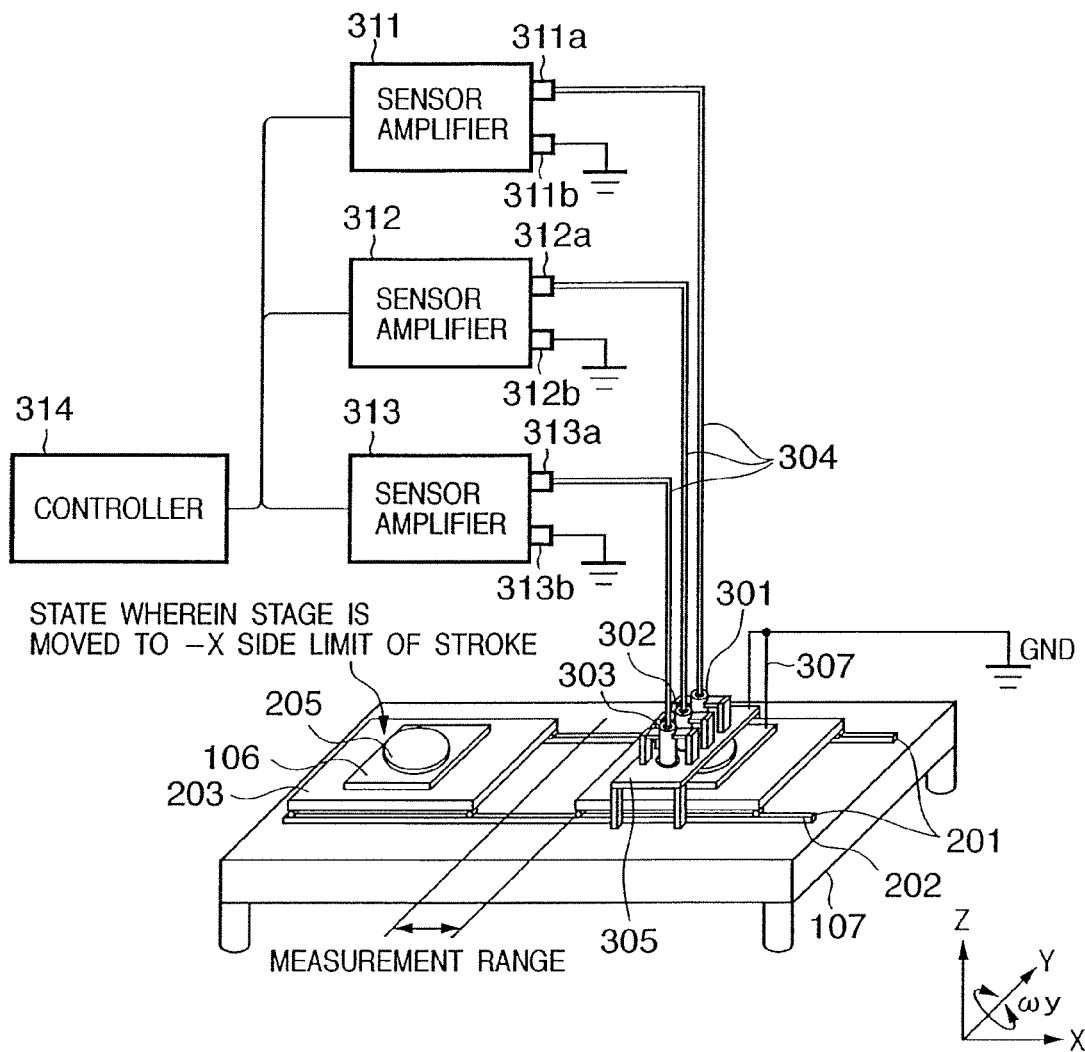
Figure 16B:
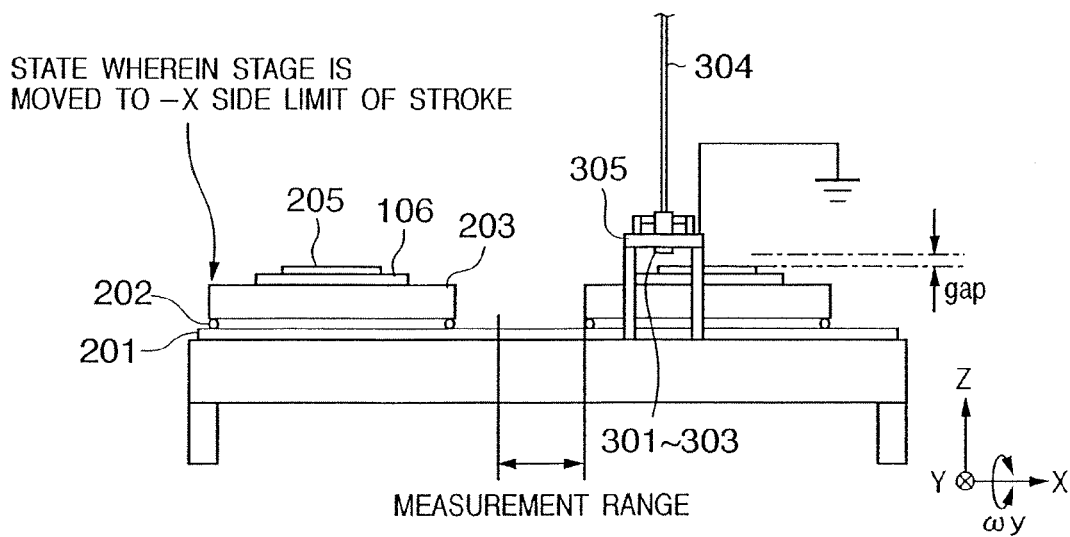
Figure 17A:
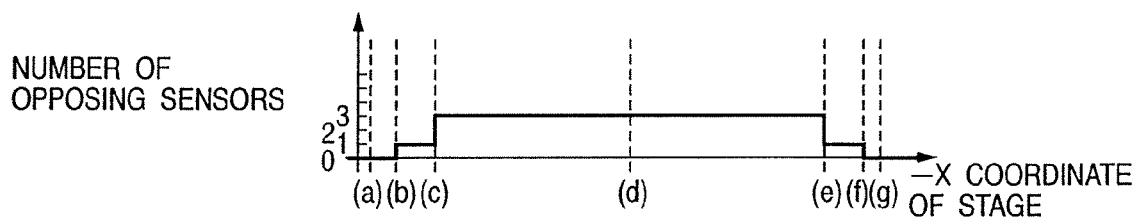
FIGS. 17A to 17E are graphs for explaining the number of opposing sensors, the ground current value, outputs from sensor amplifiers, and compensation of a measurement error, in the measuring apparatus of Comparative Example 2.
Figure 17B:
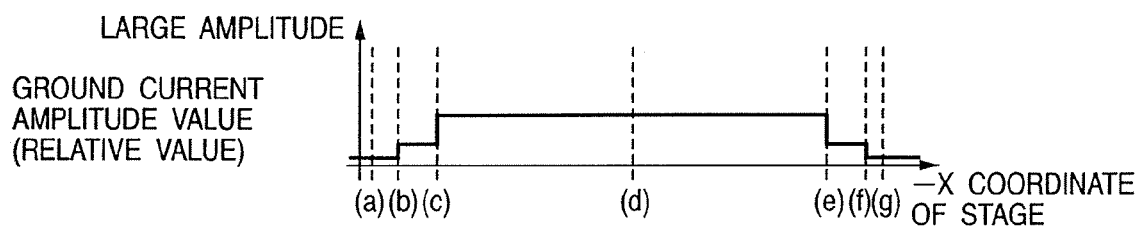
Figure 17C:
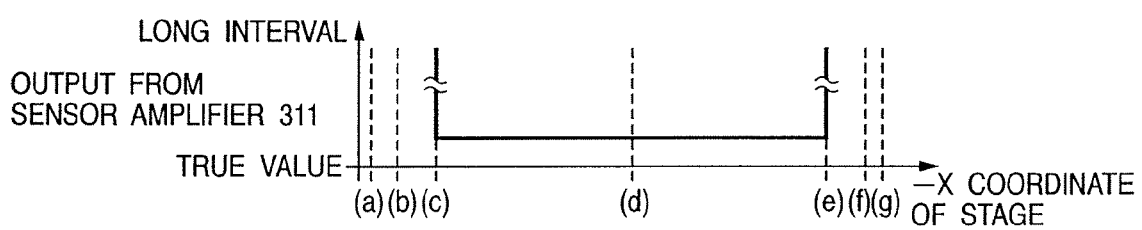
Figure 17D:
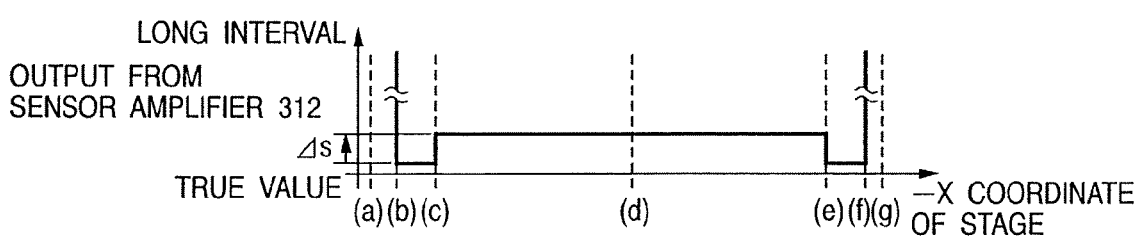
Figure 17E:
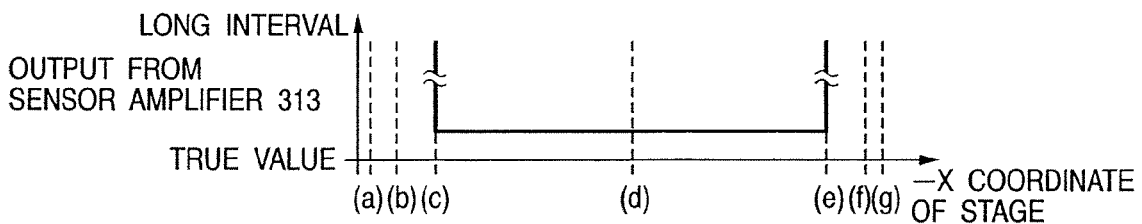

FIGS. 16A and 16B show the arrangement of a measuring apparatus using an electrostatic capacitance sensor according to Comparative Example 2. FIG. 16A is a perspective view; and FIG. 16B, a side view. Note that the same reference numerals as those in the fourth and fifth embodiments denote components having the same functions.

The measuring apparatus shown in FIGS. 16A and 16B is different from the fourth and fifth embodiments in that no compensator is provided.

The electrostatic capacitance sensor is ideally used by coupling a target sufficiently low in impedance to ground at low impedance. However, in Comparative Example 2, there may be cases wherein it is difficult to couple a target 205 to the ground terminal by a vacuum chuck 106 at low impedance. The cases include, for example, a case wherein the shape of the target 205, the shape of the vacuum chuck 106, the material for the vacuum chuck 106, or the like, is limited. In this case, the stability or precision of measurement may degrade or decrease, or precision of measurement may degrade or decrease, or an offset may occur, due to the shape of the target 205. In addition, an interference may occur between sensors in the Comparative Example 2, using a plurality of sensor probes.

In Comparative Example 1, shown in FIGS. 5A and 5B, since the vacuum chuck 106 and stage 203 have high insulating properties, the target 205 cannot be coupled to the ground terminal at low impedance. For this reason, use of capacitive coupling between the target 205 and ground can also be considered. In this case, a change in coupling impedance between the target and ground during measurement results in erroneous measurement. The coupling impedance is likely to change, particularly in measurement with relative movement of the sensor probe and target.

Occurrence of measurement errors due to changes in ground impedances of the measuring apparatuses of Comparative Examples 1 and 2 will be described with reference to FIGS. 6 and 17A to 17E.

In the measuring apparatus of Comparative Example 1 (2), capacitive coupling occurs between the target 105 (205) and the sensor holding member 150 (305). The impedance by coupling depends on the interval and the opposing area in which the target 105 (205) and the sensor holding member 150 (305) overlap each other. If the interval is constant, the impedance is inversely proportional to the area.

Figure 6:
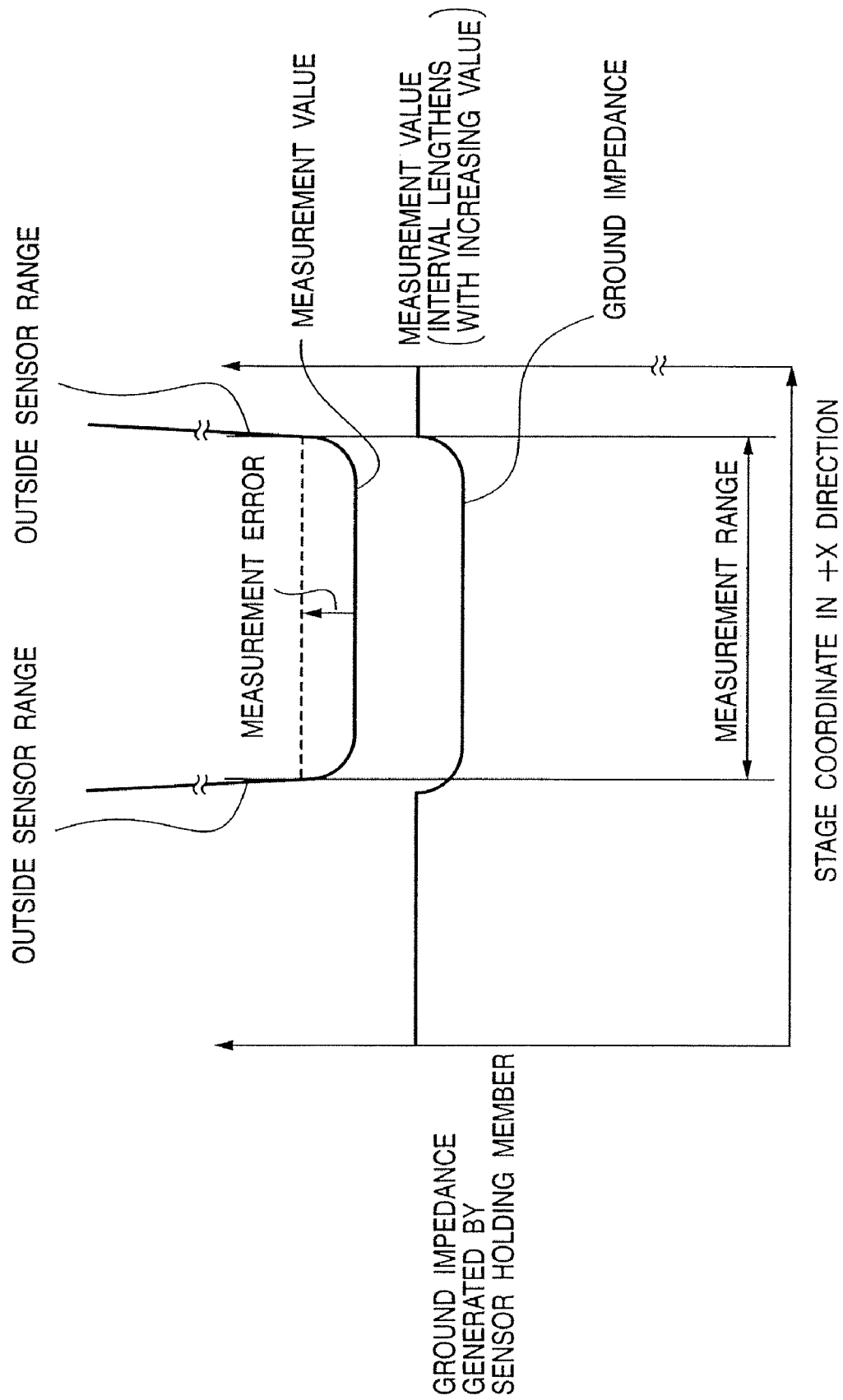
FIG. 6 is a graph showing the relationship between the ground impedance of and the measurement error in the measuring apparatus of Comparative Example 1.

In the example shown in FIG. 6, a change in ground impedance generated by the sensor holding member 150 is almost zero outside the measurement range, while it exhibits a value inversely proportional to the opposing area within the measurement range. If the sensor probe is of a constant-amplitude current type, a voltage drop due to a change in impedance is directly detected as an error. As a result, a measurement error as shown in FIG. 6 will occur.

In the example shown in FIGS. 16A and 16B, a change in ground impedance generated upon stage movement is assumed to be negligible. The coupling between the semiconductor wafer and the metal chuck is dominant, and its impedance is constant, regardless of the movement. Even in this case, the impedance itself cannot be considered to be zero, and takes a certain value.

As seen from FIGS. 15A to 15G, the number of sensor probes opposing the semiconductor wafer changes depending on the stage position. More specifically, the number is one in zones from FIG. 15A to FIG. 15B and from FIG. 15F to FIG. 15G, while the number is three in a zone from FIG. 15C to FIG. 15E. As described above, if the number of sensors opposing the semiconductor wafer changes, the value of a current supplied to the common impedance among the sensor probes changes. A measurement value from each sensor probe is influenced by the voltage drop.

FIGS. 17A to 17E show the relationship between the ground current and the measurement error in Comparative Example 2 of FIGS. 16A and 16B. Assume that a true measurement value from each sensor is constant regardless of the X coordinate within the measurement range, for the sake of descriptive simplicity.

In FIGS. 17A to 17E, points (a) to (g) on each abscissa correspond to the stage positions of FIGS. 15A to 15G, respectively. The ground current amplitude value increases or decreases depending on the number of sensors opposing the semiconductor wafer. As described above, a voltage drop caused by a ground current flowing in the ground impedance influences each measurement value. For this reason, a measurement value from the central sensor probe 302 differs by ΔS between the zones from FIG. 15B to FIG. 15C and from FIG. 15E to FIG. 15F and the zone from FIG. 15C to FIG. 15E.

As seen from the above description, if the vacuum chuck 106 of Comparative Example 1 in FIGS. 5A and 5B is made of an insulating material, a measurement error, which depends on the ground coupling impedance subject to the position described in Comparative Example 2 of FIGS. 5A and 5B, occurs, in addition to a measurement error, which depends on the number of sensor probes opposing the semiconductor wafer of Comparative Example 2 in FIGS. 16A and 16B.

Sixth Embodiment

The sixth embodiment, in which a measuring apparatus according to the present invention is applied to measurement of a semiconductor wafer position, will be described.

Figure 18A:
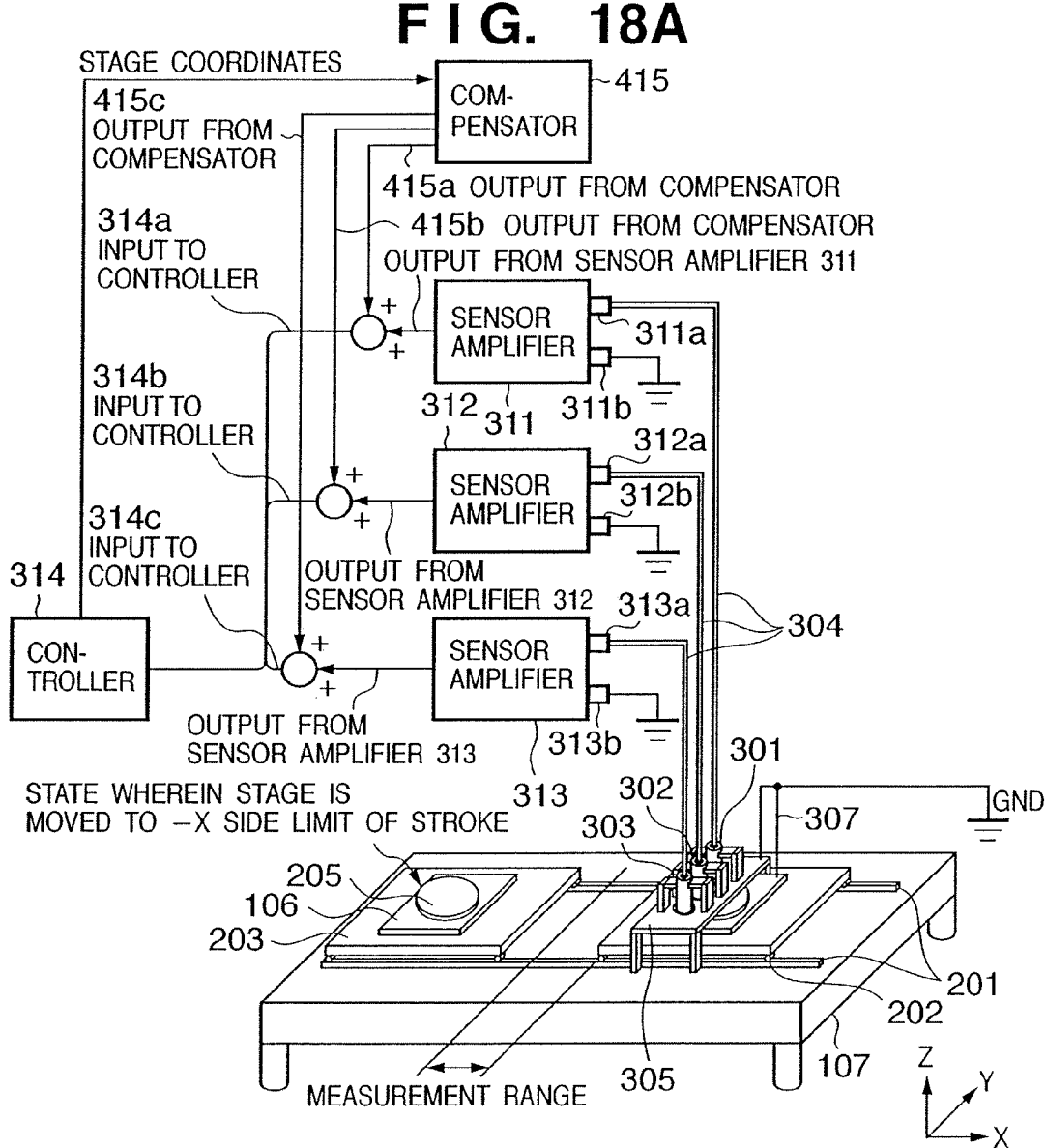
Figure 18B:
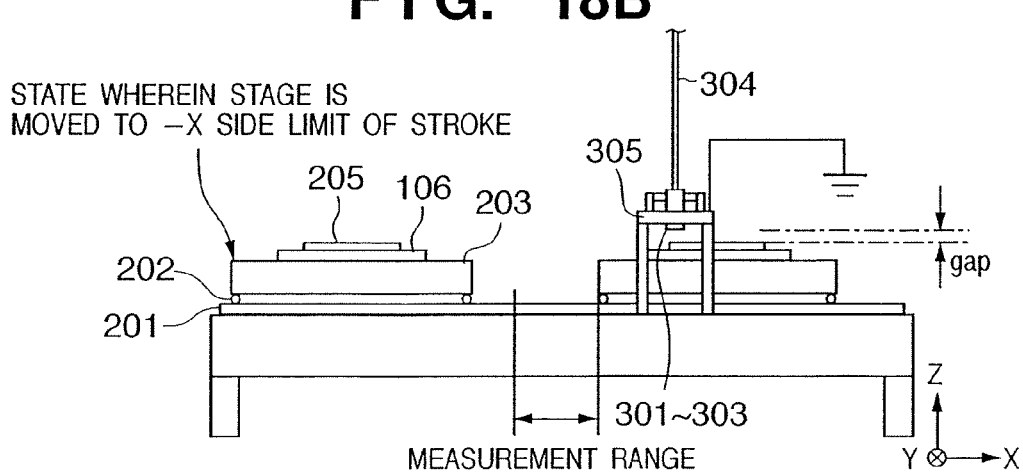

FIGS. 18A and 18B show the arrangement of the measuring apparatus according to the sixth embodiment of the present invention. The same reference numerals as those in the fifth embodiment denote the same components.

The measuring apparatus according to this embodiment measures the surface level of a semiconductor wafer 205 serving as a target, which is vacuum-chucked on an SiC (insulating) vacuum chuck 106 at a plurality of measurement points by using a plurality of (e.g., three) sensor probes 301 to 303 fixed on a sensor holding member 305.

The measuring apparatus of this embodiment is obtained by replacing the conductive chuck 306 in the fifth embodiment with the SiC chuck 106. The measuring apparatus compensates for a change in capacitance of the capacitive coupling between the target 205, and the sensor holding member 305, generated upon movement of a stage 203 for sensor amplifiers 311 and 313, while it compensates for a change in the number of opposing sensors for a sensor amplifier 312. For this purpose, the measuring apparatus comprises a compensator 45 to compensate for the compensating measurement values from the sensor amplifiers 311 to 313. An output from each of the sensor amplifiers 311 to 313 and an output from the compensator 415 are added together and input to a controller 314.

The controller 314 informs the compensator 415 of the coordinate value of the current stage position, and the compensator 415 outputs correction values 415a to 415c corresponding to the coordinate value to the respective sensor amplifiers 311 to 313. The compensator 415 comprises a nonvolatile memory and stores the relationship between the current coordinate value of the stage and the correction values as a table specific to the apparatus. As the relationship between the current stage coordinate value and the correction values, data obtained in advance by calibration is used.

A method of obtaining in advance the relationship between the stage coordinate value and the correction values will be described.

The semiconductor wafer 205 is aligned with an aligning pin (not shown) on the chuck 106. Thus, the positional relationship between the semiconductor wafer 205 and the chuck 106 is reproducibly kept, even when the wafer is replaced with another one. In this embodiment, a change in ground impedance and ground current mainly causes a voltage drop at a ground impedance portion to change along with the stage coordinates. The change in ground impedance is caused by a change in opposing area of a sensor holding member 199 and the semiconductor wafer 205, while the change in ground current is caused by a change in the number of sensors opposing the semiconductor wafer 205.

Figure 19A:
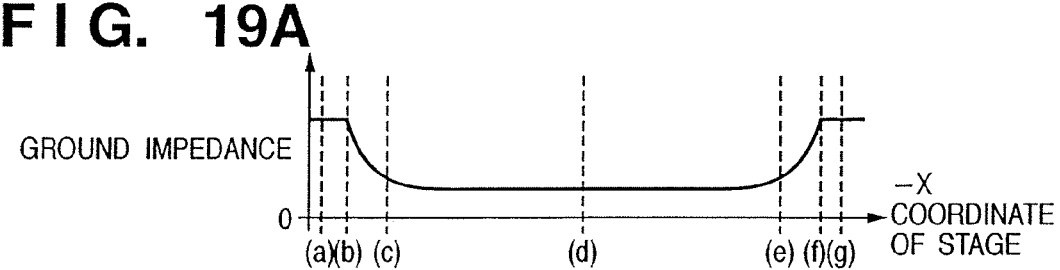
Figure 19B:
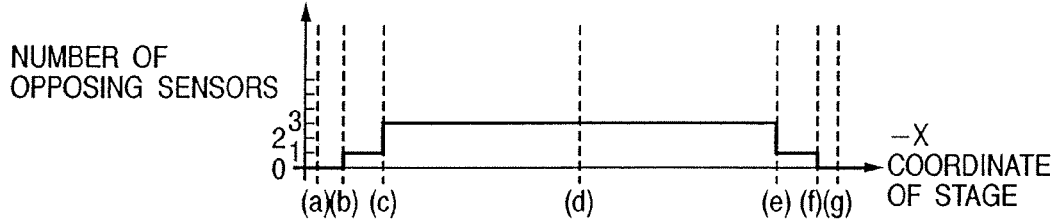
FIG. 19B is a side view.

The change in ground impedance can be obtained geometrically or by measurement in the same manner as in the above-mentioned embodiments. FIG. 19A illustrates the change in ground impedance in this embodiment.

Figure 19C:
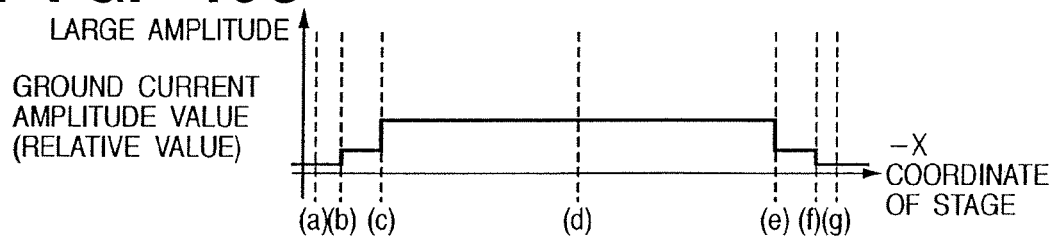
Figure 19D:
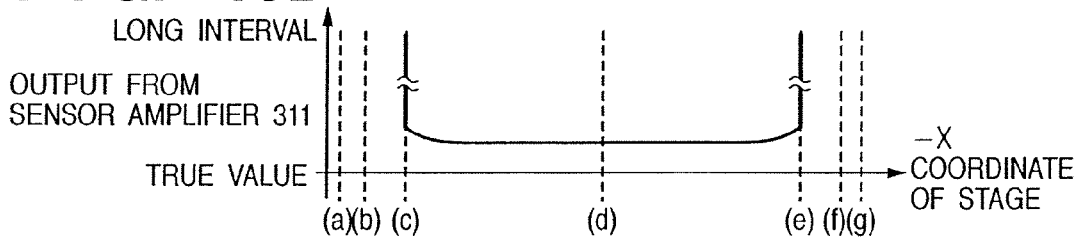
Figure 19E:
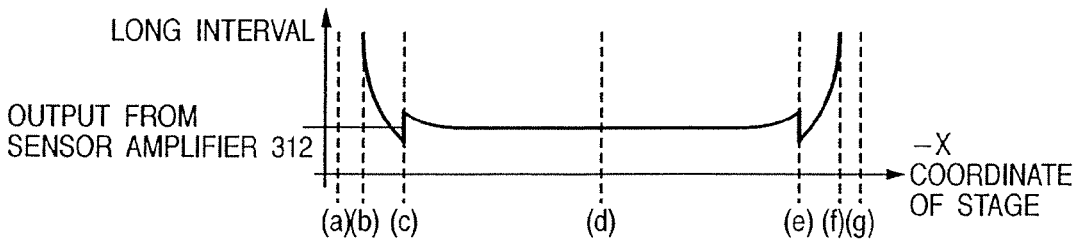
Figure 19F:
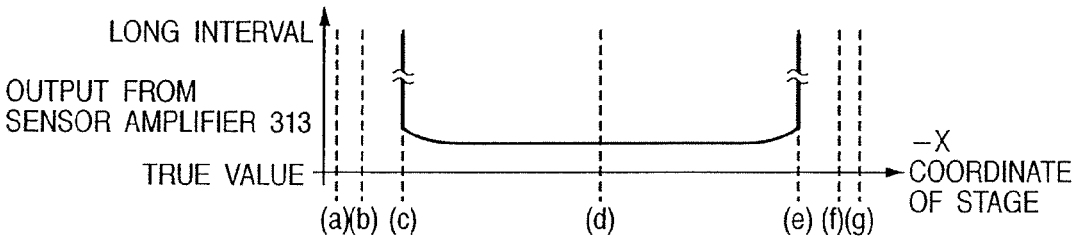

The change in ground current can be obtained geometrically or by measurement in the same manner as in the above-mentioned embodiments. FIG. 19C illustrates the change in ground current in this embodiment.

A change in voltage drop at the ground impedance portion can be obtained using the product of them. The voltage drop can be converted to a distance correction value using the voltage-to-distance conversion factors of the sensor amplifiers 311 to 313. Consequently, the compensation amounts for measurement values influenced by a voltage drop at the ground impedance portion can be associated with the stage coordinates in the form of a table.

Figure 20A:
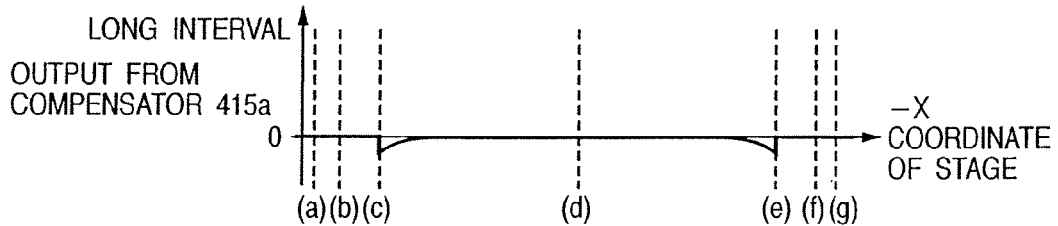
FIGS. 20A to 20F are graphs for explaining the ground impedance, the number of opposing sensors, the ground current value, outputs from sensor amplifiers, an output from a compensator, and compensation of a measurement error, in the measuring apparatus of the sixth embodiment.
Figure 20B:
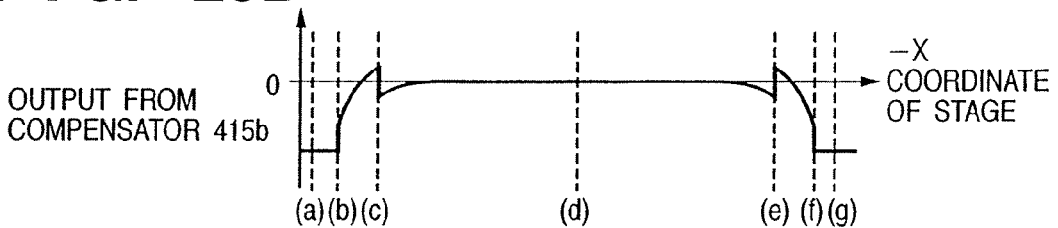
Figure 20C:
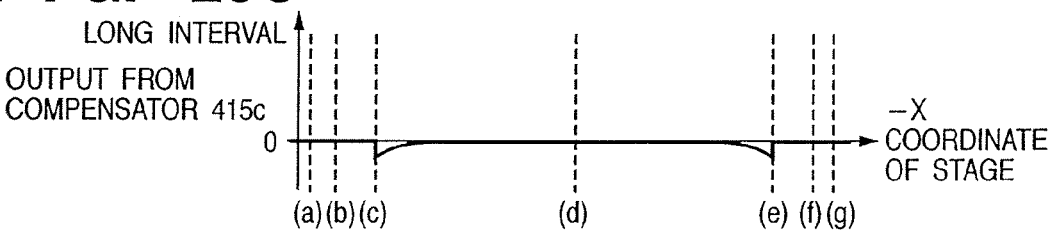
Figure 20D:
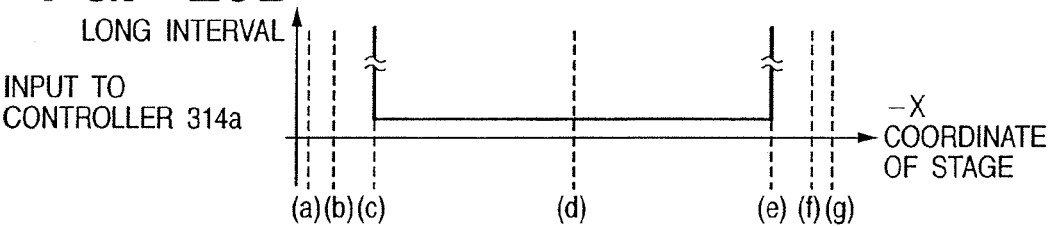
Figure 20E:
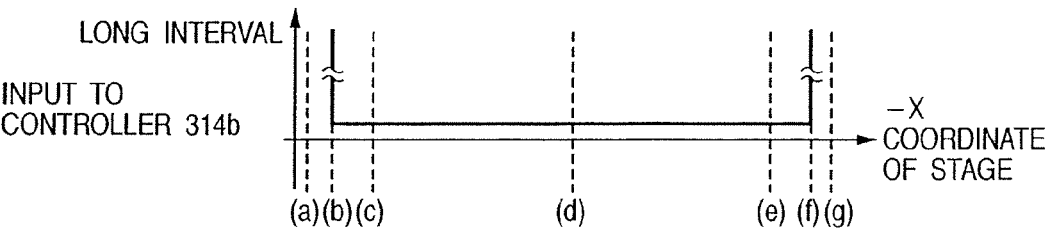
Figure 20F:
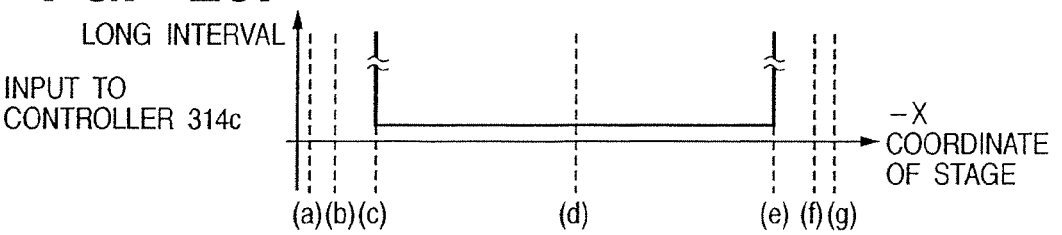

FIGS. 20A to 20C illustrate compensation amounts in this embodiment. The target 205 is assumed to be completely flat, and the stage 203 is assumed to completely translate for the sake of descriptive simplicity. Points (a) to (g) on each abscissa correspond to the stage positions in FIGS. 15A to 15G.

In this embodiment, the compensator 415 is provided separately from the controller 314 and sensor amplifiers 311 to 313. However, this arrangement is merely an example which achieves the present invention. For example, the compensator can be integrated into the controller 314 depending on the design. In this embodiment, the compensator 415 stores the current stage coordinate values and compensation amounts as an associated table. The present invention is not limited to this table, and may define arithmetic expressions to achieve the object.

This embodiment has three sensor amplifiers to be compensated. However, the number is not limited to three, and compensation can be performed in the same manner with any other number of sensor amplifiers.

Seventh Embodiment

Figure 21:
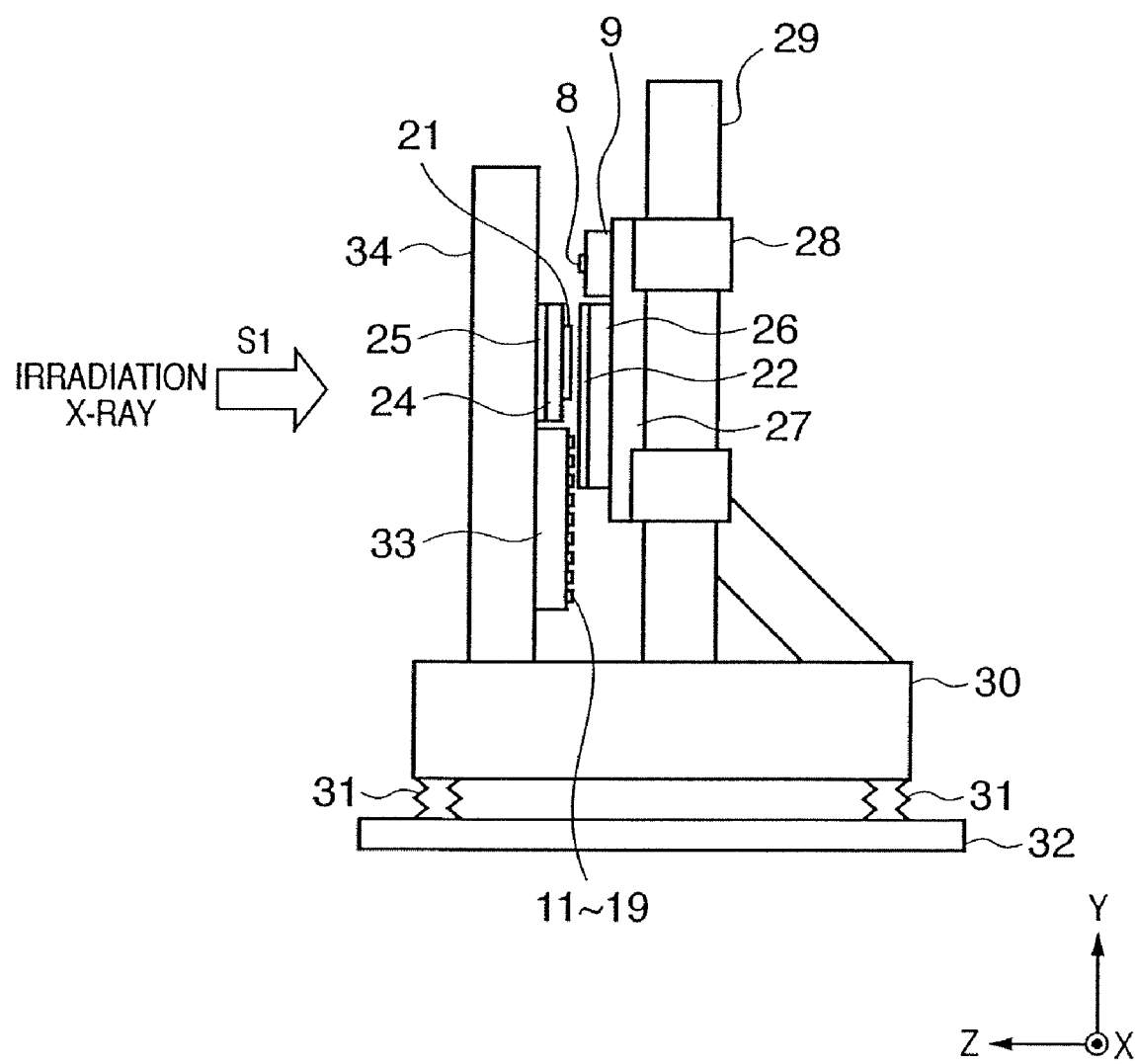
FIG. 21 is a view showing the arrangement of an X-ray exposure apparatus according to the seventh embodiment.

FIG. 21 shows a part of the arrangement of the X-ray exposure apparatus including the measuring apparatus according to the fifth and sixth embodiments of the present invention, and shows a part concerning an electrostatic capacitance sensor out of the whole apparatus.

The X-ray exposure apparatus of this embodiment uses a synchrotron ring X-ray source to perform exposure with a set proximity gap of several μm to several hundred μm at an equal magnification. In addition to a synchrotron ring X-ray source, a point source X-ray source can be used as the X-ray source. In an actual use environment, the part shown in FIG. 7 is incorporated in a sealed chamber, and kept in a high-purity helium atmosphere at 20 kPa.

In this embodiment, exposure is done while a mask and wafer are held at a very small gap of 10 μm or less. High precision is required for measuring the levels of the wafer surface and mask surface. A set gap different from an assumed one results in serious influence on an exposure result, such as degradation of the line width accuracy. To realize high throughput, the wafer is exposed by a step and repeat process, while the exposure gap is maintained. At this time, low parallelism between the mask surface and the wafer surface may lead to degradation of an exposure result and damage to the mask membrane, due to its deformation.

In this embodiment, an X-ray emitted by a synchrotron ring light source (not shown) is guided in a direction S1 in FIG. 21. In synchronism with this, exposure is done while both a mask 21 and a wafer 22 are held vertically.

Measurement of the wafer level in this embodiment finally produces a table (to be referred to as a mapping table hereinafter) for the height information of lattice points at a pitch of 20 mm on the wafer 22. In exposure, the mapping table is used to perform a step and repeat operation while maintaining the proximity gap between the mask and the wafer to simultaneously drive the Z-, ωx-, ωy-axes so as to maintain the gap of several μm to several hundred μm specified in exposure. Concurrently with this, a wafer stage 27 is driven in the X and Y directions, thereby performing the step and repeat operation.

In this embodiment, the interval between the lattice points in the Y direction of the mapping table and the interval between installed sensor probes are set to be equal to each other, that is, 20 mm. Hence, the overall measurement can be done by one scanning operation of the wafer stage 27 in the X direction.

The mask 21 has a structure similar to that shown in FIGS. 9A and 9B and is chucked by a mask chuck 24. The mask chuck 24 is mounted on a mask stage 25, and has the degree of freedom of movement around the Z-, θ-, ωx-, and ωy-axes.

In FIG. 21, the wafer 22 is transferred onto a wafer chuck 26 by a wafer transfer system (not shown) and vacuum-chucked by the wafer chuck 26. The wafer chuck 26 is made of SiC, and has many small pins on the chuck surface. The wafer chuck 26 is mounted on the SiC wafer stage 27. The wafer stage 27 can move under the guidance of an X stage 28 and a Y stage 29. The Y stage guide 29 is clamped to a surface plate 30. The surface plate 30 is set on a floor 32 via dampers 31, which cut off floor vibrations. The wafer stage 27 is driven by a linear motor, or the like, and has the degree of freedom of movement around the X-, Y-, Z-, θ-, ωx-, and ωy-axes.

In exposure, an alignment measuring unit (not shown) measures a horizontal shift between the mask 21 and the wafer 22, thereby performing precise alignment.

Measurement by the electrostatic capacitance sensor according to this embodiment will be described.

After the wafer 22 is chucked, the wafer stage 27 is driven to measure lattice points at a pitch of 20 mm on the wafer 22 by the electrostatic capacitance sensor. In this embodiment, a circular wafer having a diameter of 200 mm is used as the target. Nine wafer measurement sensor probes 11 to 19 are provided, and measurement is done by driving the wafer stage 27 in the X direction so as to cover all measurement points. The Y-coordinate in measurement is predetermined. In measurement, the wafer stage 27 need not be stopped. A controller for the wafer stage 27 can perform measurement while managing measurement timings for coordinates, and driving the wafer stage.

The wafer measurement sensor probes 11 to 19 are attached to a metal member, which is attached to a mask frame 34 and also functions as an opposing ground plate. The metal member is connected to the ground terminal of a sensor amplifier (not shown) by using a conductor. In this embodiment, since the target is circular, the shape of an area in which the target can move within the measurement area is as shown by a wafer level sensor opposing plate 33 of FIGS. 22A to 22E. In this case, the opposing electrode area of a plate capacitor, which is formed between the wafer and the opposing ground plate, is always equal to the area of the wafer, and the distance is constant, within the stage movement range for wafer level measurement. There is a limited space inside an exposure apparatus, as described in this embodiment, and the area of the opposing plate is minimized with little margin.

A mask measurement sensor probe 8 is attached to a metal member, which is attached to the wafer stage 27, and also functions as an opposing ground plate. The metal plate is connected to the ground terminal of a sensor amplifier (not shown) by using a conductor. The mask stage 25 of this embodiment has no mechanism for movement in the X and Y directions, and a plurality of points on the mask are measured by moving the wafer stage 27.

Figure 22A:
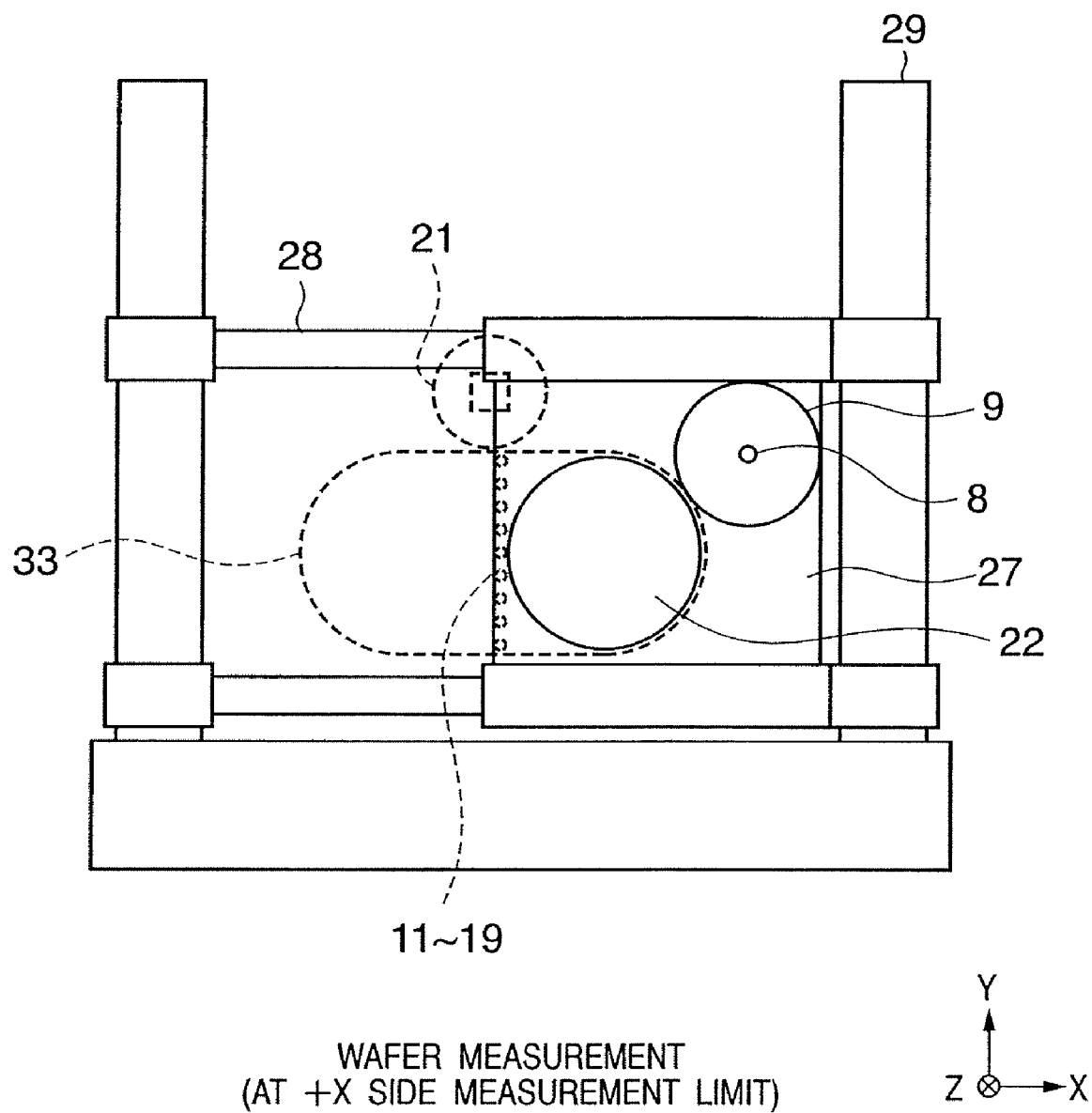
FIGS. 22A to 22E are views for explaining the measurement operation of the X-ray exposure apparatus of the seventh embodiment.
Figure 22B:
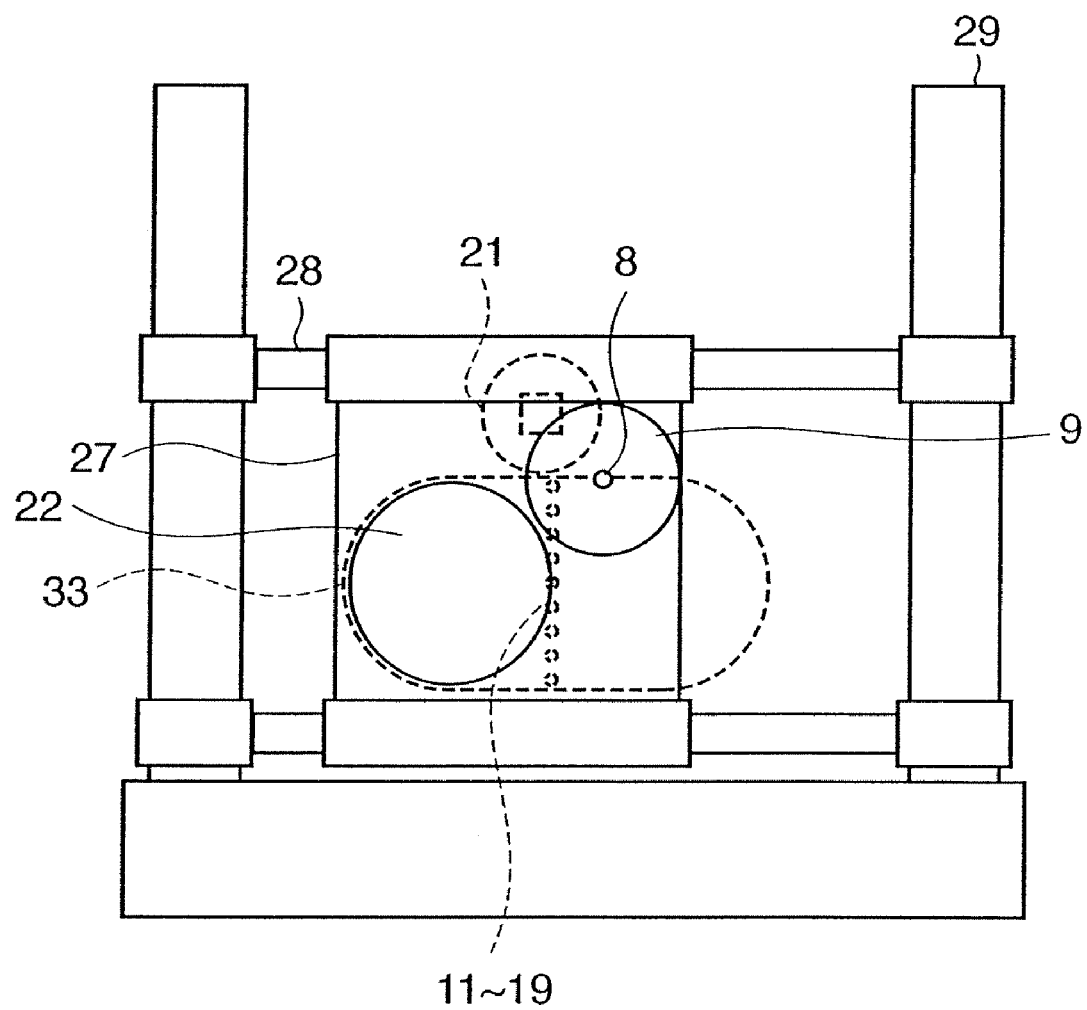
Figure 22C:
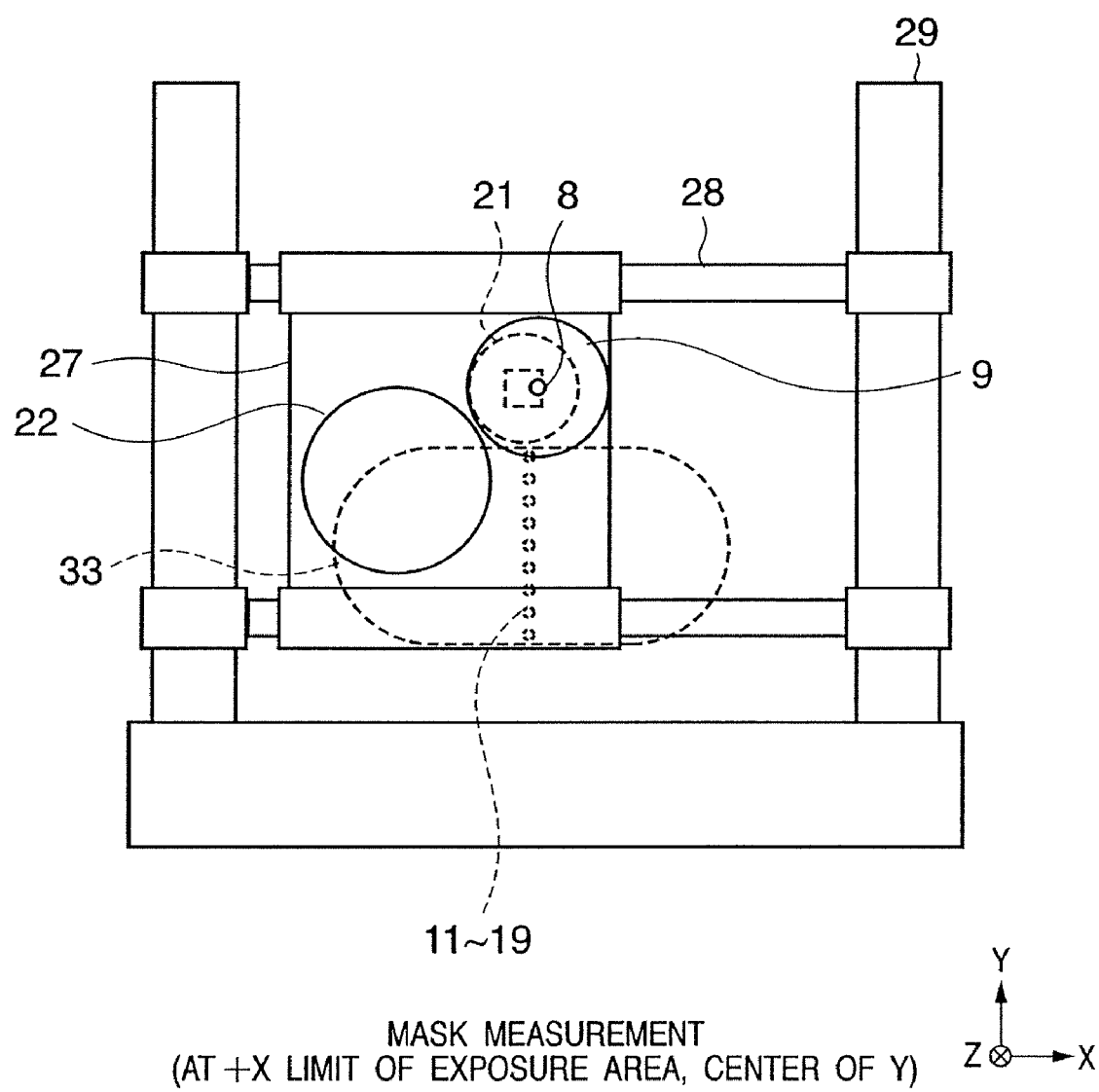
Figure 22D:
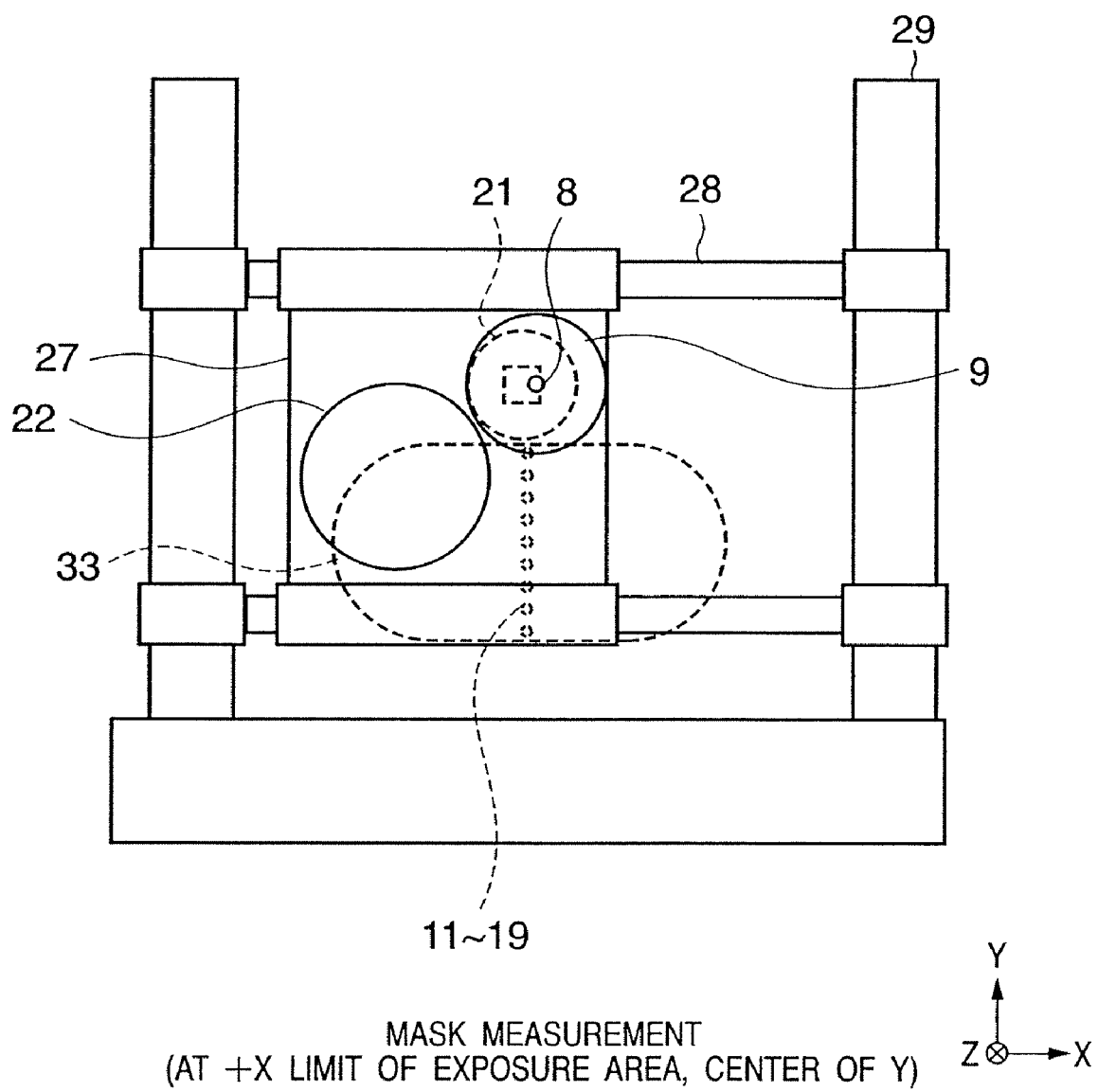
Figure 22E:
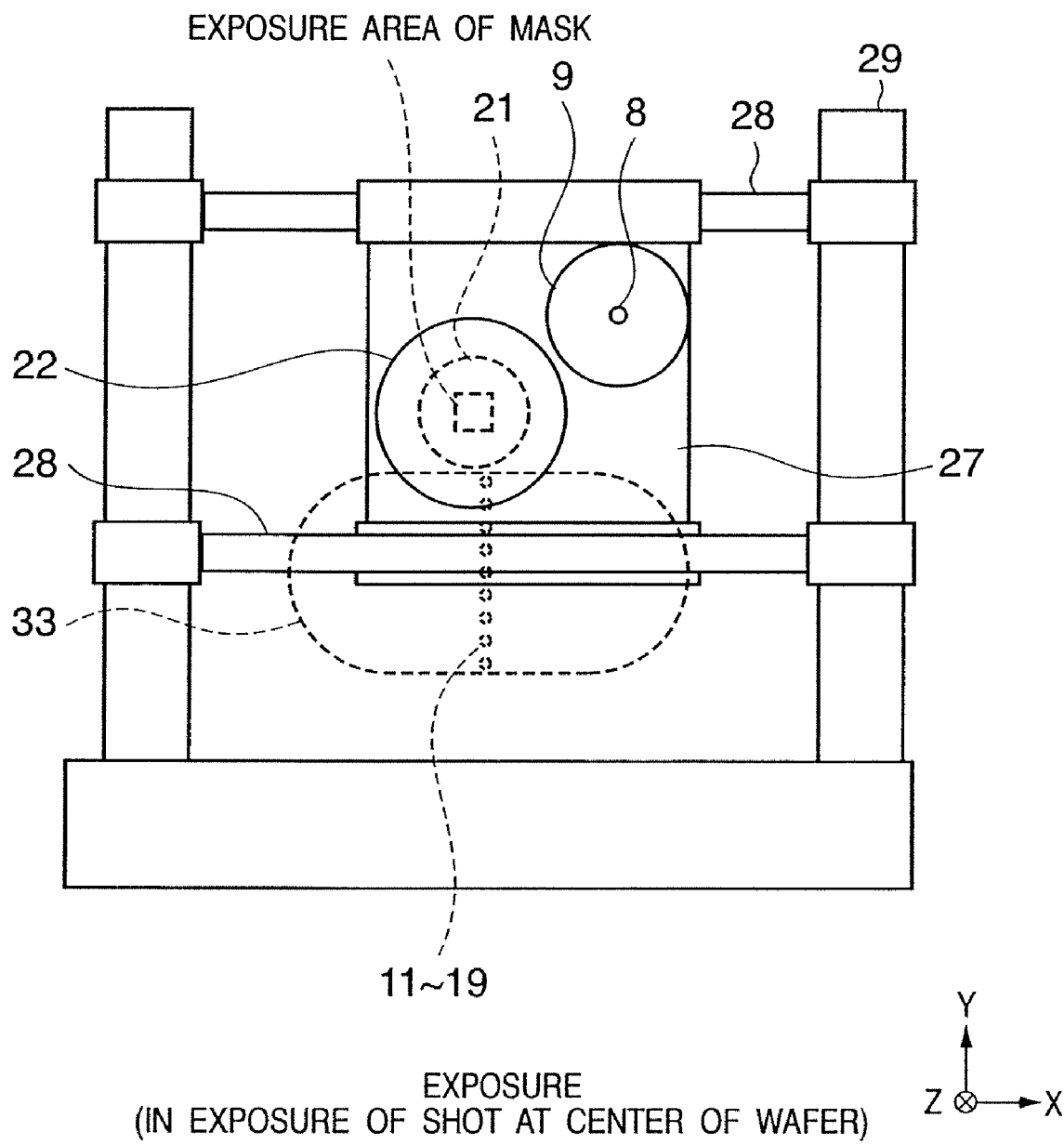

In FIGS. 22A to 22E, the exposure area of the mask has the maximum range allowed as the apparatus specification. In this embodiment, mask level measurement points are located near the centers of the sides of the outer edge of the exposure area on the mask. As shown in FIGS. 22C and 22D, the opposing electrode area of a plate capacitor, which is formed between the mask level sensor opposing plate 9, and a mask substrate 21 is always set to be equal to the area of the mask substrate.

It is difficult to ground without any mechanism influence a substrate supported by an insulator, as described in this embodiment. This embodiment can produce a grounding effect regardless of the material for and shape of a support member, and a chucking method.

Figure 23:
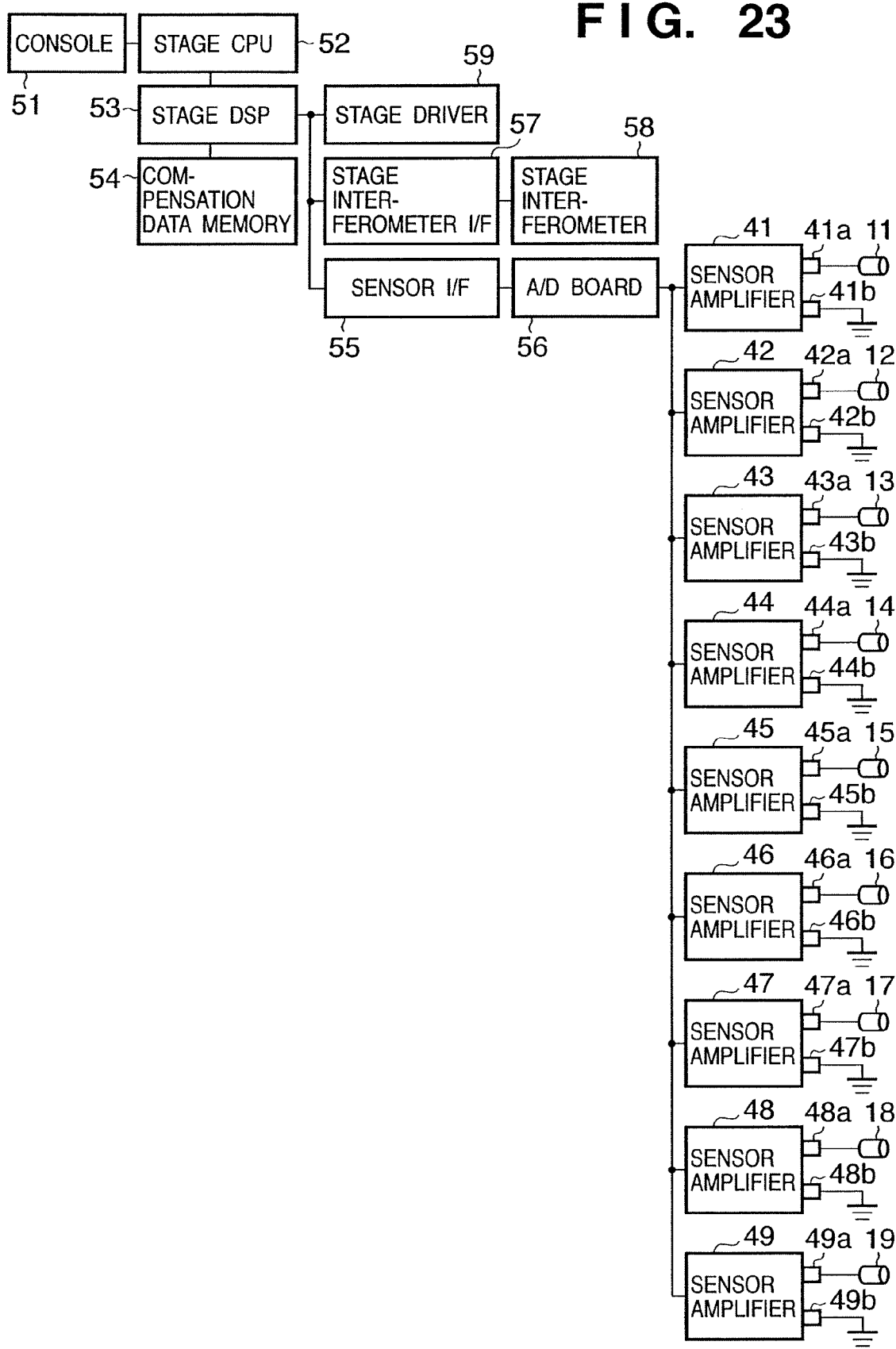
FIG. 23 is a control block diagram of the X-ray exposure apparatus of the seventh embodiment.
Figure 26A:
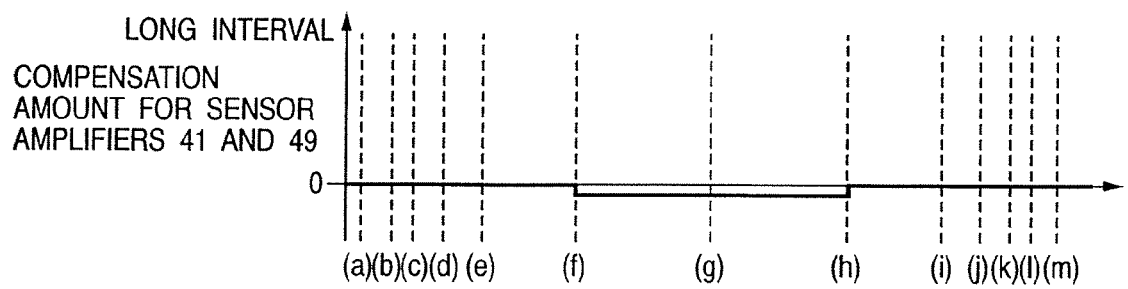
FIGS. 26A to 26D are graphs for explaining the ground current value, outputs from sensor amplifiers, and compensation amounts, in the X-ray exposure apparatus of the seventh embodiment.
Figure 26B:
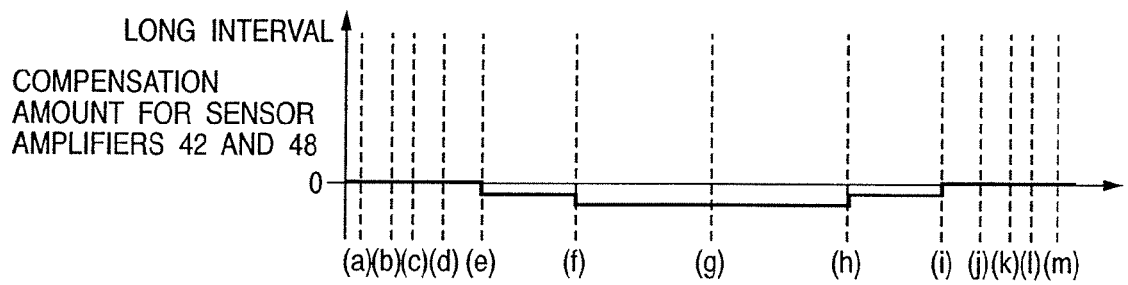
Figure 26C:
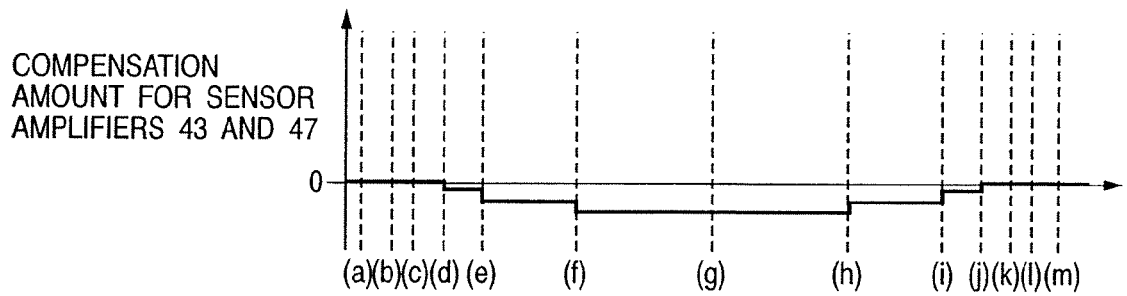
Figure 26D:
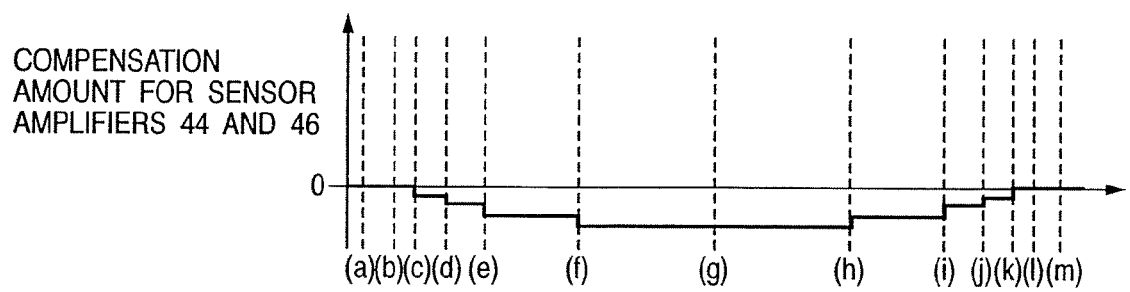
Figure 27:
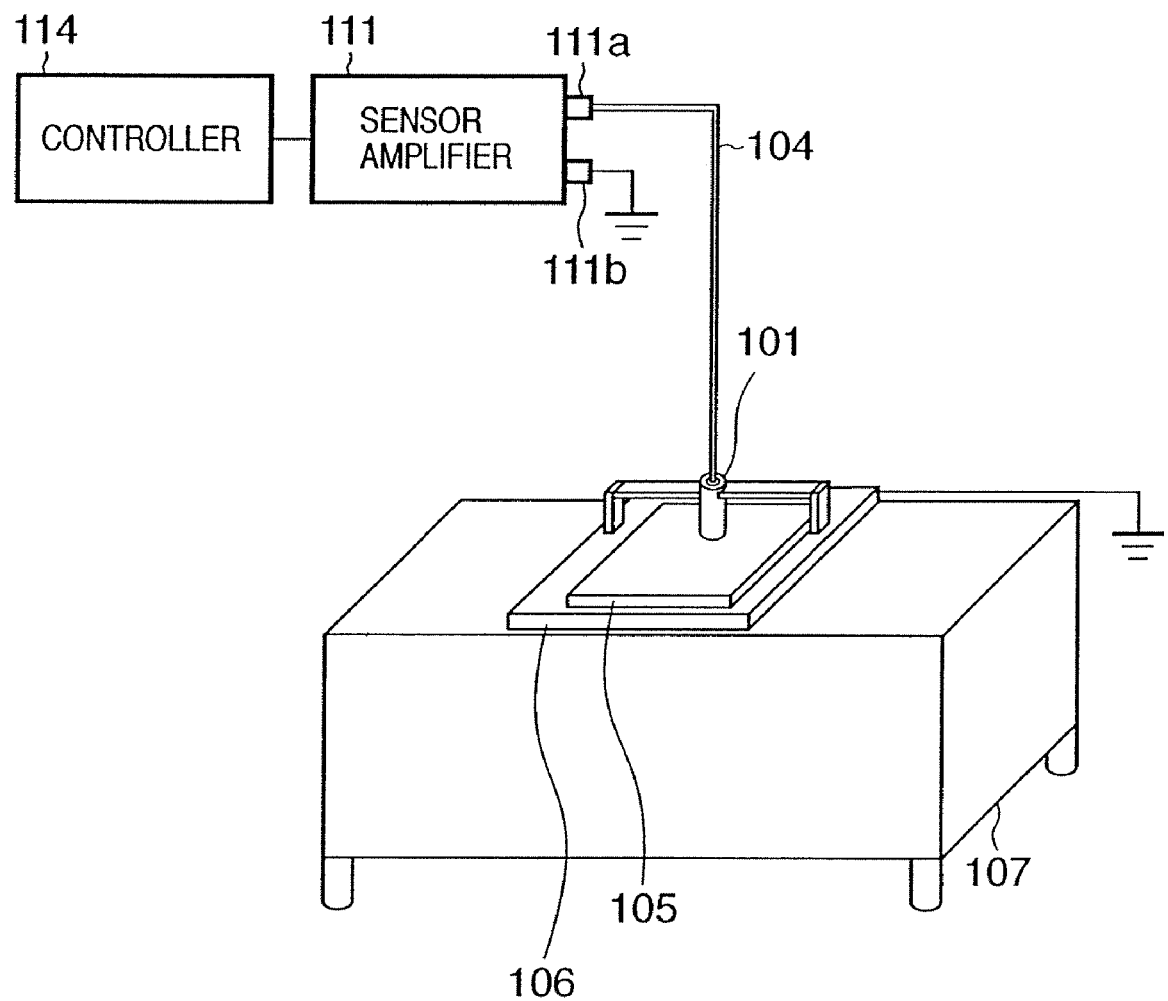
FIG. 27 is a view showing the arrangement of a conventional measuring apparatus.

FIG. 23 is a block diagram that pertains to a wafer level measurement function of this embodiment.

A console 51 controls the sequence of the whole exposure apparatus, and the user interface. A stage CPU 52 controls the operation sequence of the wafer stage 27. A stage DSP 53 has a digital signal processor and executes precise digital control of the stage position and velocity. In wafer level measurement, the stage DSP 53 issues a wafer level measurement command while moving the wafer stage 27, and reads a measurement result.

The stage DSP 53 outputs driving control signals for the wafer stage 27 and mask stage 25 to a stage driver 59 for these stages on the basis of a measurement value from a stage interferometer 58 that is input via a stage interferometer I/F 57.

The stage DSP 53 can associate the stage coordinates at the time of measurement, a measurement value, and a correction value read from a sensor compensation data memory with each other. These three types of values are stored in a memory 54 inside the stage DSP 53 unit as a measurement value table. After a measurement operation, the stage CPU 52 reads the measurement value table and performs calculations, thereby creating a mapping table of lattice points at a pitch of 20 mm on the wafer 22.

The stage CPU 52, the stage DSP 53, and a sensor I/F (interface) 55 are connected to a bus. When the sensor I/F receives a measurement timing signal from the stage DSP 53, it transmits the measurement timing signal to an A/D board 56. The A/D board A/D-converts an output from a sensor amplifier in accordance with the measurement timing signal.

The A/D board 56 serially converts a measurement value and serially transfers it to the sensor I/F 55. The sensor I/F 55 parallelly converts the transferred serial signal and rasterizes it onto a dual port memory connected to the bus.

In this embodiment, a wafer level measurement value is subjected to parallel-serial-parallel conversion after A/D conversion in order to reduce transmission noise and the number of cables.

An ideal measurement sequence includes simultaneous A/D conversion of outputs (measurement values) from all sensor amplifiers. This enables measurement precisely synchronized with the stage coordinates. Sequential conversions of an output from each sensor amplifier may result in little problem, depending on a trade-off between the measurement interval and the stage velocity. A serial conversion method can share an A/D converter, and can offer advantages, such as easy adjustment and a cost reduction.

The sensor probes 11 to 19 each have a structure similar to the above-mentioned embodiments. Sensor amplifiers 41 to 49 are connected to the sensor probes 11 to 19, respectively. The sensor amplifiers 41 to 49 comprise central electrode terminals 41a to 49a, guard electrode terminals, and ground terminals 41b to 49b. A sine-wave constant-amplitude current of several tens of kHz is supplied from the sensor amplifiers 41 to 49 to the central electrodes. The current flows into housing ground via the capacitively coupled target. Ground is connected to the ground terminals of the respective sensor amplifiers 41 to 49. The sensor amplifiers 41 to 49 detect the voltages across the central electrode terminals 41a to 49a and the ground terminals 41b to 49b, thereby detecting the impedance of a closed circuit, including the capacitive impedance of the measurement gap. The detected impedance information is transmitted as an analog signal to the A/D board 56.

The sensor probes 11 to 19 are attached to the metal sensor probe mounting member 33, which is attached to the mask frame 34. The metal member 33 is connected to the ground terminals 41b to 49b of the sensor amplifiers (not shown in FIGS. 22A to 22E) by using conductors.

It is difficult to ground without any mechanical influence a substrate supported by an insulator, as described in this embodiment. For this reason, the impedance between the wafer and ground is generated by capacitive coupling, and a change in ground impedance generated upon wafer movement is hard to prevent. More specifically, the capacitive coupling between the wafer and the sensor probe mounting unit is dominant. The absolute value of the ground impedance becomes large, and a change in voltage drop occurs at a ground impedance portion due to a change in ground current. The change in ground current is caused by a change in the number of sensor probes opposing the wafer, as in the fifth embodiment.

Under the circumstances, in this embodiment, compensation data with characteristics shown in FIGS. 26A to 26D is stored in the memory 54 and used to compensate for measurement values.

A method of creating the compensation data will be described below.

In this embodiment, the area of the sensor probe mounting unit 33 opposing the wafer 22, and the number of sensors opposing the wafer 22 are already known, as shown in FIGS. 24A to 24M. FIGS. 24A to 24M show typical positions where the number of sensors changes. This makes it possible to quantitatively describe the opposing area and the number of opposing sensors with respect to all coordinates during measurement.

As shown in FIGS. 25A to 25J and 26A to 26D, the ground impedance can be obtained from the area of the sensor probe mounting unit 33 opposing the wafer 22. The ground current can be obtained from the number of sensors opposing the wafer 22. A voltage drop by the ground impedance at each stage coordinate position can be obtained from both of them. These data are tabulated and used as compensation data. Note that points (a) to (m) on each abscissa correspond to the stage positions in FIGS. 24A to 24M.

According to the fourth to seventh embodiments, a measuring apparatus using an electrostatic capacitance sensor can produce the following effects.

According to the fourth embodiment, a measurement error due to a change in coupling capacitance between the target and ground can be compensated for at high precision.

According to the fifth embodiment, a measurement error due to a change in sensor current supplied to the ground impedance can be compensated for at high precision.

According to the sixth embodiment, a measurement error due to a change in coupling capacitance between the target and ground and a change in sensor current supplied to the ground impedance can be compensated for at high precision.

According to the seventh embodiment, application of the measuring apparatus using the electrostatic capacitance sensor according to each of the above-mentioned embodiments to a semiconductor manufacturing apparatus can provide a high-precision, high-throughput, low-cost apparatus.

Other Embodiment

The functions of the above-mentioned embodiments can also be achieved by supplying software, such as a program for implementing the distance measurement flows of the embodiments to a system or apparatus directly or from a remote place, and allowing a computer of the system or apparatus to read out and execute the supplied software. In this case, the form need not be a program as far as the software has a program function.

Embodiments of the present invention include software itself installed in the computer in order to realize the functions and processes of the above-mentioned embodiments by the computer.

In this case, the software includes, for example, an object code, a program executed by an interpreter, script data supplied to an operating system (OS), or the like. The type of software is not specifically limited.

A recording medium for supplying the software includes, for example, a flexible disk, a hard disk, an optical disk, a magnetooptical disk, an MO, a CD-ROM, a CD-R, a CD-RW, a magnetic tape, a nonvolatile memory card, a ROM, a DVD (DVD-ROM and DVD-R), and the like.

The software can be supplied by downloading the software itself or a compressed file containing an automatic installing function from an Internet homepage to a recording medium, such as a hard disk, via the browser of the client's computer. The software can also be supplied by dividing the software into a plurality of files, and downloading the files from different homepages. Hence, embodiments of the present invention also include a World Wide Web (WWW) server, which allows the user to download the software.

The software can also be supplied by the following operation. A storage medium, such as a CD-ROM, having the software encrypted and stored therein is distributed to the users. A user who satisfies predetermined conditions is caused to download decryption key information from a homepage via the Internet. The user executes the encrypted software by using the key information, and installs the software in the computer.

The functions of the above-mentioned embodiments are realized when the computer executes the readout software. Also, embodiments of the present invention include a case wherein the functions of the above-mentioned embodiments are realized when an OS, or the like, running on the computer performs part or all of actual processing on the basis of the instructions of the software.

Furthermore, embodiments of the present invention include a case wherein the functions of the above-mentioned embodiments are also realized when the program read out from the recording medium is written in the memory of a function expansion unit connected to the computer, and the CPU, or the like, of the function expansion board or function expansion unit performs part or all or actual processing on the basis of the instructions of the software.

As many apparently widely different embodiments of the present invention can be made without departing from the spirit and scope thereof, it is to be understood that the invention is not limited to the specific embodiments thereof except as defined in the appended claims.

What is claimed is:

1. A measuring apparatus having a probe that faces a surface of a target and is configured to supply AC current to the surface, measuring a voltage drop through a space between the probe and the surface, and obtaining a distance between the probe and the surface in accordance with the measured voltage drop, said apparatus comprising:
- a ground member facing, and apart from, the surface and configured to ground the surface by capacitive coupling; and
- a stage configured to hold either of the target and the probe and to move to define a measurement area on the surface,
- wherein said ground member is configured so that said ground member covers all areas of the surface with respect to each of a plurality of measurement areas on the surface defined by a position of said stage.

2. An apparatus according to claim 1, wherein said stage is configured to hold the target, and said ground member is larger than a measurement range of an area of the surface of the target moved with said stage.

3. An apparatus according to claim 1, further comprising a chuck configured to hold the target, said chuck being made of an insulating material.

4. An exposure apparatus for exposing a substrate to light via a mask, said apparatus comprising:
- a measuring apparatus having a probe, which is defined in claim 1, for obtaining a distance between said probe and a surface of a target, the target being one of the substrate and the mask.

* * * * *